(12) United States Patent
Ramer et al.

(10) Patent No.: US 10,711,978 B2
(45) Date of Patent: Jul. 14, 2020

(54) LUMINAIRE USING HOLOGRAPHIC OPTICAL ELEMENT AND LUMINESCENT MATERIAL

(71) Applicant: ABL IP HOLDING LLC, Conyers, GA (US)

(72) Inventors: David P. Ramer, Reston, VA (US); Guan-Bo Lin, Reston, VA (US); An Mao, Jersey City, NJ (US); Januk Aggarwal, Alexandria, VA (US); Rashmi Kumar Rogers, Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/227,028

(22) Filed: Dec. 20, 2018

(65) Prior Publication Data
US 2020/0011509 A1 Jan. 9, 2020

Related U.S. Application Data

(63) Continuation-in-part of application No. 16/030,193, filed on Jul. 9, 2018.

(51) Int. Cl.
| | | |
|---|---|---|
| *F21V 9/16* | (2006.01) | |
| *F21V 9/32* | (2018.01) | |
| *G02B 5/32* | (2006.01) | |
| *F21K 9/64* | (2016.01) | |
| *F21Y 115/30* | (2016.01) | |

(52) U.S. Cl.
CPC .................. *F21V 9/32* (2018.02); *F21K 9/64* (2016.08); *G02B 5/32* (2013.01); *F21Y 2115/30* (2016.08)

(58) Field of Classification Search
CPC ..... F21V 9/32; F21K 9/64; G02B 5/32; F21Y 2115/30
USPC .......................................................... 362/84
See application file for complete search history.

(56) References Cited

U.S. PATENT DOCUMENTS

| | | | |
|---|---|---|---|
| 6,483,613 B1 * | 11/2002 | Woodgate | G02B 5/1876 349/104 |
| 6,870,671 B2 | 3/2005 | Travis | |
| 2009/0067156 A1 | 3/2009 | Bonnett et al. | |
| 2011/0279039 A1 * | 11/2011 | Kishimoto | H05B 33/0803 315/113 |
| 2012/0050645 A1 | 3/2012 | Okada et al. | |
| 2013/0250381 A1 * | 9/2013 | Toko | G02B 5/32 359/19 |
| 2014/0036361 A1 | 2/2014 | Woodgate et al. | |
| 2015/0088385 A1 * | 3/2015 | Fleury | B60J 3/04 701/48 |

(Continued)

OTHER PUBLICATIONS

Non-final Office Action for U.S. Appl. No. 16/227,128, dated Oct. 21, 2019, 17 pages.

(Continued)

*Primary Examiner* — Ali Alavi
(74) *Attorney, Agent, or Firm* — RatnerPrestia

(57) ABSTRACT

An example luminaire includes a laser light source, a photoluminescent material and a holographic optical element. The holographic optical element has a hologram optically coupled to the laser light source and to the photoluminescent material. The hologram is configured to distribute light received from the laser light source as a pattern of light to the photoluminescent material.

18 Claims, 10 Drawing Sheets

(56) References Cited

U.S. PATENT DOCUMENTS

2018/0038558 A1    2/2018  Woisetschlaeger et al.
2018/0038559 A1    2/2018  Mueller

OTHER PUBLICATIONS

Wikipedia, "Holography," https://en.wikipedia.org/wiki/Holography, last edited on Oct. 8, 2018, 27 pages.
Entire prosecution history of U.S. Appl. No. 16/030,193, filed Jul. 9, 2018, entitled "Laser Illumination Lighting Device With Solid Medium Freeform Prism or Waveguide."
Entire prosecution history of U.S. Appl. No. 16/227,128, filed Dec. 20, 2018, entitled "Tunable Holographic Laser Lighting for Versatile Luminaire."
Notice of Allowance for U.S. Appl. No. 16/030,193, dated Jul. 17, 2019, 14 pages.
Notice of Allowance dated Feb. 5, 2020 for U.S. Appl. No. 16/227,128, filed Dec. 20, 2018 (11 pages).

* cited by examiner

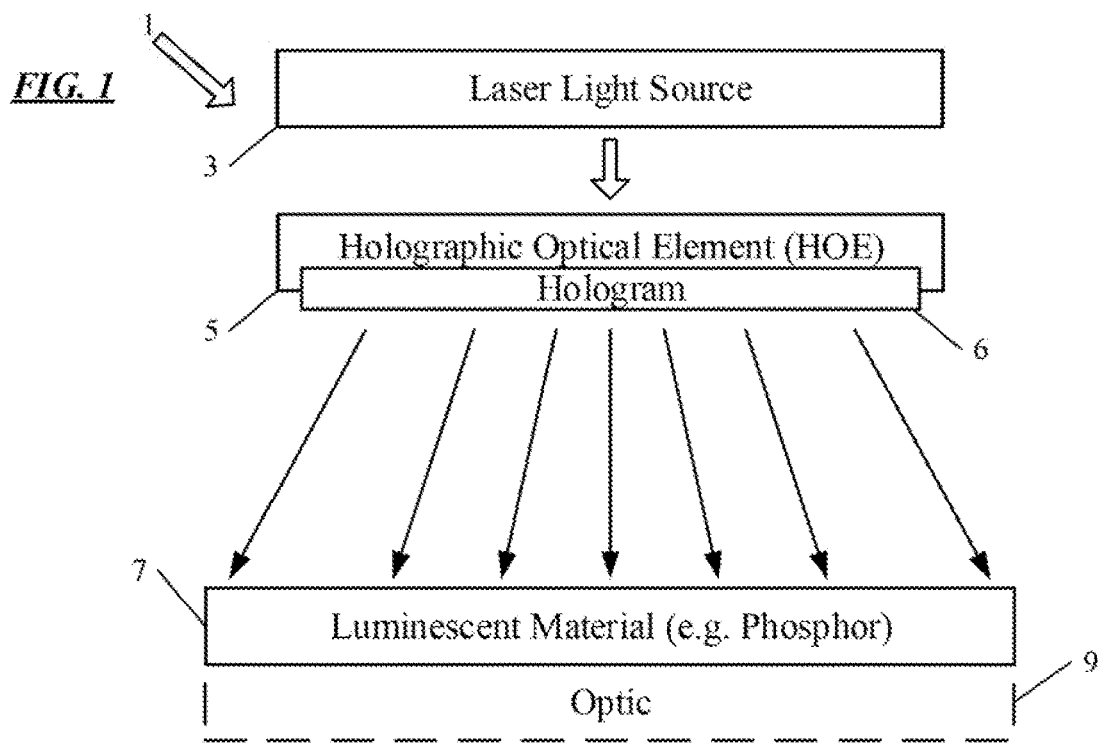

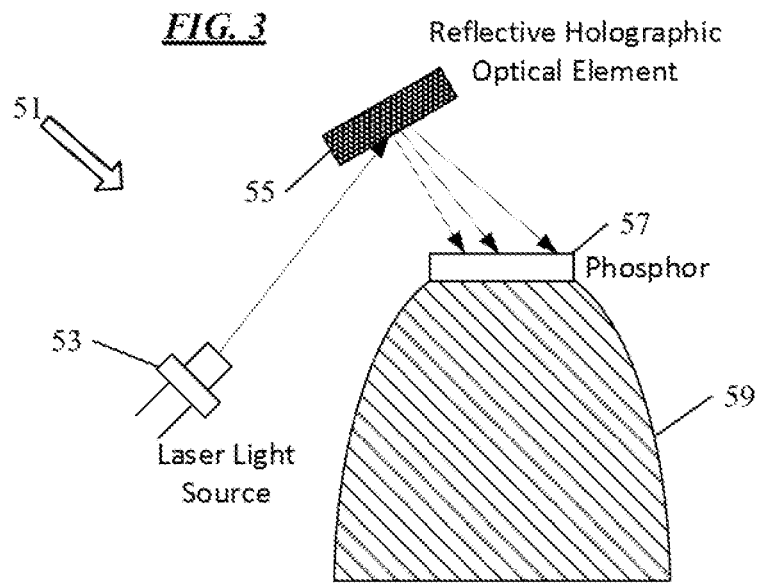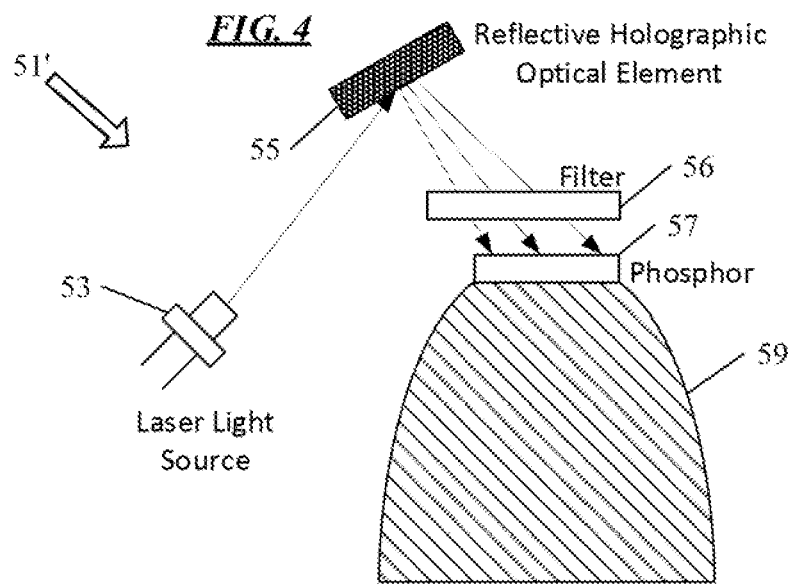

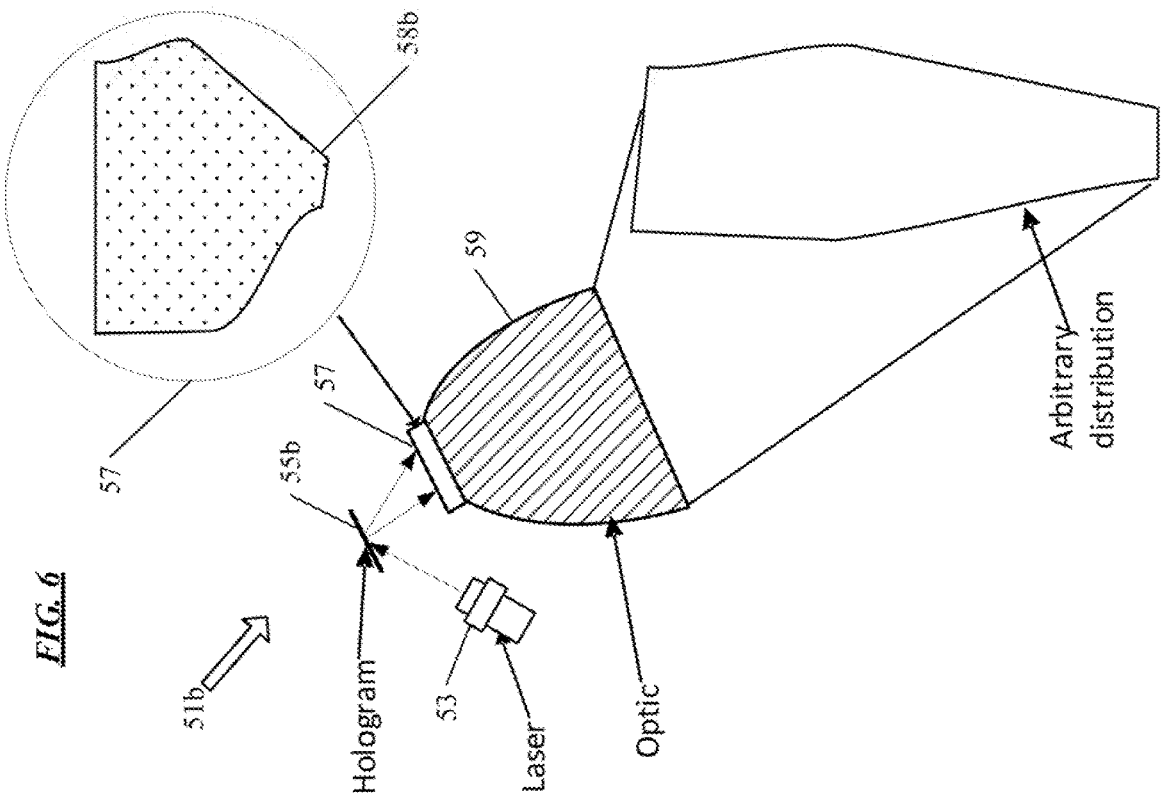
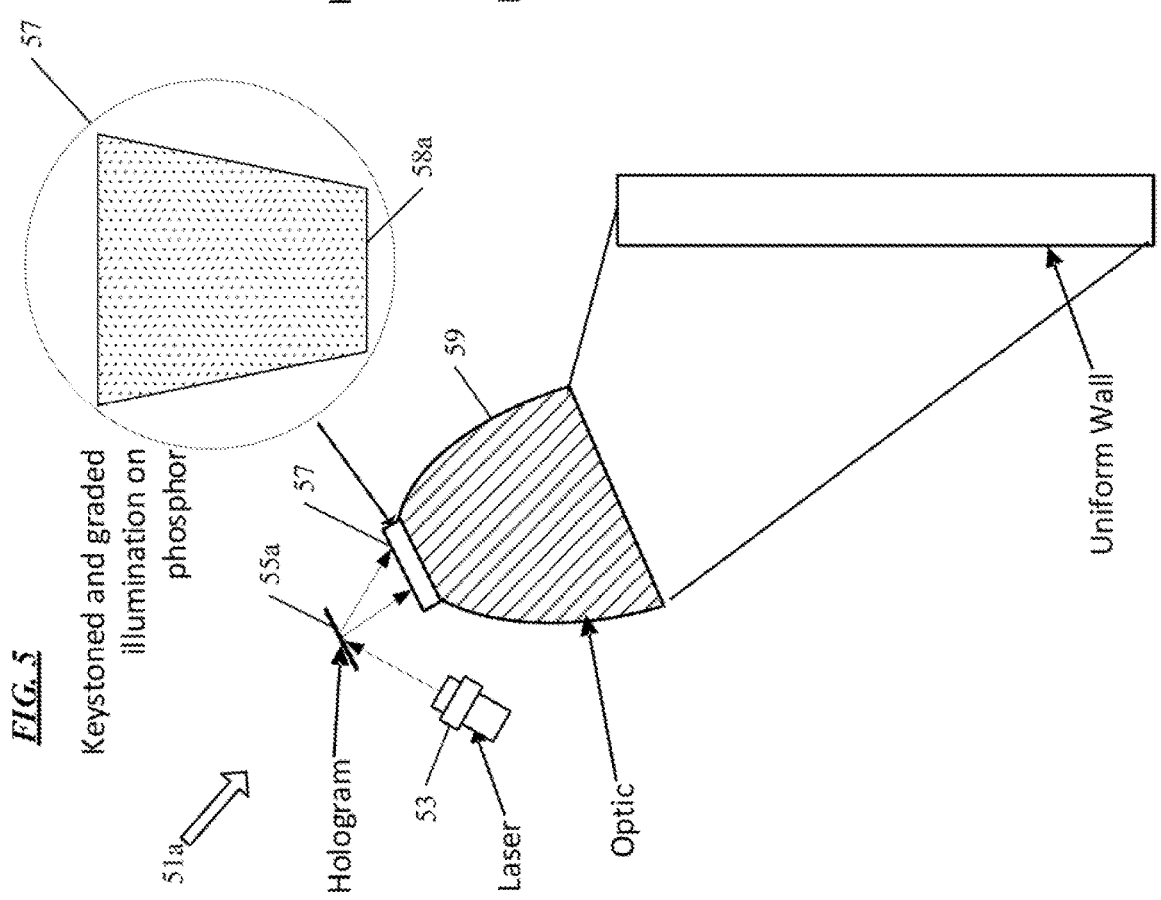

LUMINAIRE USING HOLOGRAPHIC OPTICAL ELEMENT AND LUMINESCENT MATERIAL

CROSS-REFERENCE TO RELATED APPLICATIONS

This application is a continuation-in-part of and claims priority from U.S. application Ser. No. 16/030,193, Filed Jul. 9, 2018, entitled LASER ILLUMINATION LIGHTING DEVICE WITH SOLID MEDIUM FREEFORM PRISM OR WAVEGUIDE, the entire contents of which are incorporated herein by reference.

This application also is related to U.S. application Ser. No. 16/227,128, Filed concurrently herewith on Dec. 20, 2018, entitled TUNABLE HOLOGRAPHIC LASER LIGHTING FOR VERSATILE LUMINAIRE, the entire contents of which are incorporated herein by reference.

TECHNICAL FIELD

The present subject matter relates to various examples of an artificial lighting luminaire for a general illumination application, which utilizes a laser light source, a holographic optical element, and a photoluminescent material coupled to receive a pattern of light from the holographic optical element.

BACKGROUND

Electrically powered artificial lighting for general illumination purposes has become ubiquitous in modern society. Electrical lighting equipment is commonly deployed, for example, in homes, buildings of commercial and other enterprise establishments, as well as in various outdoor settings. The light sources utilized in luminaires for general illumination have evolved from traditional sources, such as incandescent or fluorescent lamps, to increasingly efficient solid state light sources. The most common form of solid state light sources utilized in luminaires is the light emitting diode or "LED."

LED based general illumination lighting, however, has limitations. LEDs, for example, typically emit light over a rather broad angular output field, typically called Lambertian angular distribution with 120-degree beam angle (full-width at half-maximum). Even with optical elements to somewhat narrow the output angle range, some light often is lost outside the desired area of illumination. To achieve desired overall lumen output, luminaires for most general lighting applications have some number of LEDs. Due to the wide angular distribution, the LEDs usually are deployed in an array or other grid pattern of point sources.

Laser light sources are good pumping sources and have high power in a relatively small package with extremely strong directionality. A phosphor or other photo luminescent material pumped by ultraviolet (UV) or blue light from a laser emitter produces longer wavelength light. With an appropriate phosphor, for example, such laser light may be converted into a white light output. Due to safety concerns and low optical efficiency, however, laser light sources are typically not utilized as a light source for general illumination in the lighting industry. If not fully converted or otherwise filtered out, UV may be harmful to the skin or eyes of people exposed to illumination from a luminaire that uses UV pumped phosphor. Blue laser light is not dangerous because of the wavelength of blue colored light, but instead may be harmful because the laser light beam is highly focused and coherent, resulting in a high power density light source.

Although blue laser light sources have been utilized in automobile headlamp applications, the designs for those lighting devices involve several mirrors to deflect the blue laser light and have many air gaps. The air gaps and mirrors in the design of such lighting devices are problematic for several reasons. In the event of breakage of the lighting device (e.g., during an automobile accident), the blue laser light is not confined and escapes outside, which can harm a living organism exposed to the blue laser light directly, or even indirectly. Accordingly, incorporating a blue laser light source into a luminaire for general illumination in a safe and optically efficient design is difficult.

Instead, most general illumination lighting therefore utilizes a group of series connected white LEDs of approximately the same brightness capacity mounted on a printed circuit board to form an LED based light engine. The LEDs are mounted on a printed circuitry board, and assembly of a luminaire requires mounting of one or more secondary optics to process the light from the LEDs to produce a desired light output distribution. This approach, however, limits the types of light output distributions that can be produced by LED based luminaires, particularly without requiring complex and/or costly LED arrangements and circuit boards. For example, LED based luminaires utilize rigid printed circuit boards. Because of the large number of LEDs and attendant need for a larger circuit board, LED light engines are difficult to adapt to curved or irregular luminaire configurations.

There is room for improvement in solid state lighting for general illumination to address some or all of the issues outlined above.

SUMMARY

The concepts disclosed herein provide improvements in luminaires and/or lighting devices for general illumination applications, and overcome some or all of the concerns outlined above.

An example luminaire for a general illumination application includes a laser light source and a holographic optical element. The holographic optical element is coupled to receive a beam of light from the laser light source. The holographic optical element has a hologram configured to distribute light from the beam as a pattern of light. The example luminaire also includes a photoluminescent material located to receive the pattern of light from the holographic optical element. The photoluminescent material is configured to convert one or more wavelengths of incident light to wavelengths of light to provide an intended color characteristic of light for the general illumination application of the luminaire. The example luminaire also includes an optical system coupled to the photoluminescent material to distribute light from the photoluminescent material over an optical output distribution for the general illumination application of the luminaire.

An example general illumination type lighting device includes a laser light source, a photoluminescent material and a holographic optical element. The holographic optical element is optically coupled to the laser light source and to the photoluminescent material. The holographic element has a hologram configured to distribute light received from the laser light source as a pattern of light to the photoluminescent material. An optical system is coupled to the photoluminescent material to distribute light from the photoluminescent material over an optical output distribution of the device. The example lighting device also includes a controllable drive circuit to supply power to the laser light source.

In another example, a luminaire includes a laser light source, a photoluminescent material and a holographic optical element. The holographic optical element has a hologram optically coupled to the laser light source and to the photoluminescent material. The hologram is configured to distribute light received from the laser light source as a pattern of light to the photoluminescent material.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 1 is a high-level functional block diagram of an example of a laser-based luminaire.

FIG. 2 is a side/partial cross-sectional view of a first more specific example of a laser-based luminaire.

FIG. 3 is a side/partial cross-sectional view of another example of a laser-based luminaire.

FIG. 4 is a side/partial cross-sectional view of another example of a laser-based luminaire, similar to the example luminaire of FIG. 3 but with an added filter.

FIG. 5 is a side/partial cross-sectional view of another example of a laser-based luminaire, which also shows an illumination distribution as might be produced on a phosphor as a result of distribution of laser light by a first hologram and an associated first output distribution from the luminaire.

FIG. 6 is a side/partial cross-sectional view of another example of a laser-based luminaire, similar to the luminaire of FIG. 5, but which also shows an illumination distribution as might be produced on a phosphor as a result of distribution of laser light by a different second hologram and an associated second output distribution from the luminaire.

DETAILED DESCRIPTION

Figure 7:
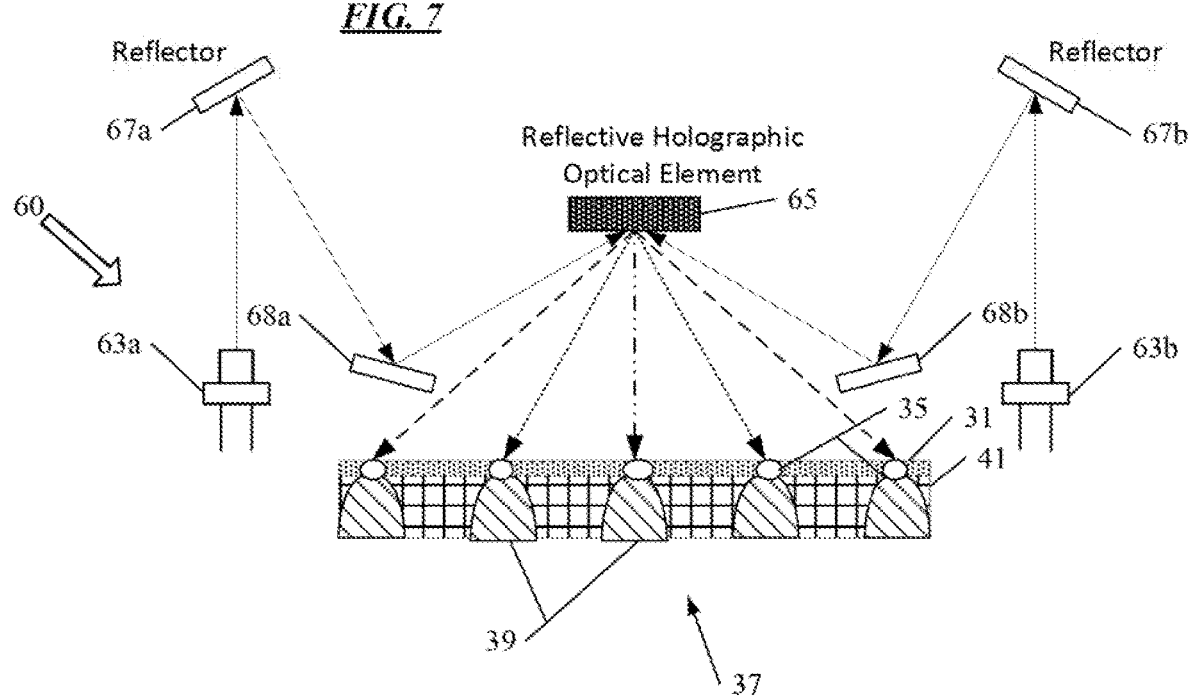
FIG. 7 is a side/partial cross-sectional view of another example of a laser-based luminaire that utilizes multiple laser diodes, mirrors and a reflective holographic optical element.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Many of the constraints found in luminaire designs that utilize LED based light sources result from the need for an array of point emitters (the LEDs) across a flat printed circuit board. Hence, there is room for improvement in luminaires for general illumination applications to address some or all of the issues outlined above. It may be advantageous to provide simpler lighting yet with more sophisticated output distributions without the need for such: complex optics, large number of included solid state emitters, large or flat printed circuit boards and/or more complex circuitry to drive the solid state emitters. If laser light sources are utilized to address any of the issues of concern, then the arrangement of the laser source(s) and any optic should be well suited to general illumination but without the drawbacks associated with the secondary optics (e.g. complex arrangement or numbers of mirrors to deflect the laser light) as utilized in laser-based lighting equipment for vehicle applications.

The various examples disclosed herein relate to a luminaire and/or a lighting device for general illumination that includes a laser light source, a holographic optical element, and a photoluminscennt material. Many of the examples also include and an optical system or secondary "optic." The holographic optical element is optically coupled to the laser light source and to the photoluminescent material. The holographic element has a hologram configured to distribute light received from the laser light source as a pattern of light to the photoluminescent material. If included, the optical system is coupled to the photoluminescent material to distribute light from the photoluminescent material over an optical output distribution of the luminaire or device.

The term "luminaire," as used herein, is intended to encompass essentially any type of lamp, light fixture or the like that includes a laser light source that processes energy to generate or supply the laser beam(s) used via the hologram and photoluminescent material to generate the artificial light, for example, for a general illumination application in a space intended for a use such as occupancy or observation, typically by a living organism that can take advantage of or be affected in some desired manner by the light emitted from the luminaire. However, a laser-based luminaire may provide light for use by automated equipment, such as sensors/monitors, robots, etc. that may occupy or observe the illuminated space, instead of or in addition to light provided for an organism. However, it is also possible that one or more laser-based luminaires in or on a particular premises serve other general lighting applications, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue, or for observation of the information of a sign, etc. Typically, in the examples, the laser light source pumps the photoluminescent material to provide white light output from the luminaire of intensity and/or color characteristic(s) suitable for the particular general illumination application of the luminaire. The actual laser light source in the luminaire may be any type of laser light emitting device, several examples of which are included in the discussions below.

A laser-based lighting device for a general lighting application includes elements similar to those of the laser-based luminaire, e.g. the laser light source, the holographic optical element, the photoluminescent material and the optical system, although such a lighting device may also include other elements. Examples of such other elements include the drive circuitry to operate the emitter or emitters of the laser light source, any associated processor or the like to control the source via the driver circuitry and possibly one or more communication interfaces and/or one or more sensors.

Terms such as luminaire, lighting device and/or lighting system, as used herein, are intended to encompass essentially any type of laser-based lighting equipment for a general lighting type application that incorporates the laser light source, holographic optical element, the photoluminescent material, and if provided, any secondary optic(s). A luminaire, for example, may take the form of a lamp, light fixture, or the like, which by itself contains no intelligence or communication capability. The illumination light output of an artificial illumination type luminaire or lighting device, for example, may have an intensity and/or other characteristic(s) that satisfy an industry acceptable performance standard for a particular general lighting application.

The term "coupled" as used herein broadly encompasses both physical or mechanical type strurural connection between elements as well as any logical, optical, physical or electrical connection, link or the like by which signals or light produced or supplied by one element are imparted to another coupled element. Unless described otherwise, coupled elements or devices are not necessarily directly connected to one another and may be separated by intermediate components, elements, communication media, etc.

Light output from the luminaire or lighting device may carry information, such as a code (e.g. to identify a luminaire or its location) or downstream transmission of communication signaling and/or user data. The light based data transmission may involve modulation or otherwise adjusting parameters (e.g. intensity, color characteristic or distribution) of the illumination light output from the device.

As noted, blue laser light sources have been utilized in automobile headlamp applications. A lighting device configured for a vehicle application such as a headlamp, however, typically is not commercially viable for a general lighting application, therefore a laser-based vehicle lighting device is not readily adaptable for a general lighting application. It may be helpful to consider several examples of distinctions, one or more of which may be present in the laser based general lighting equipment examples described in more detail below. For example, power ranges are more flexible for laser based general lighting. General lighting devices using a laser based luminaire usually can be attached to the electricity grid while vehicle laser headlamps rely on a vehicle battery and power generator. This electrical distinction offers more power, for example, for much larger luminous flux output for general laser lighting. As another example, there is a size limitation for laser-based vehicle headlamps to enable mounting thereof in the conventional headlamp spaces on the front of the vehicle approximately on opposite sides of the crowded engine room. However, a laser based luminaire for general lighting has no such size limitation allowing a more flexible laser source arrangement in general laser lighting (mechanical/geometrical distinction). Furthermore, a headlamp typically provides a relatively thin slab light distribution in front of the vehicle and extending only as far above the road surface as optimal for driver visibility of objects generally in front of the vehicle. Stated another way, a main purpose of vehicle lighting is to illuminate oncoming objects, such as static signs along the street and pedestrians crossing or walking along the street. Hence, an optimal light distribution of headlamps is quite flat (restricted in the height dimension of the light output). On the other hand, General lighting need not be so restricted for light output distribution; and for many general lighting applications, an optimized two-dimensional lighting distribution at a certain distance is preferred, e.g. having an intended intensity distribution over a designated area of a plane onto which the luminaire projects general illumination light (optical distinction). Also, the color quality of light output for a vehicle lighting application, such as a headlamp, is not that important. For most general lighting applications, designers and occupants care about color quality metrics of light, such as coordinated color temperature (CCT) or color rendering index (CRI). Example general lighting luminaires described below typically include photoluminescent material optimized to produce a desirable color quality in the luminaire output light (chromatic distinction). Also, the intended color characteristic may be changed for different users or applications by use of a different photoluminescent material, either in different versions of the luminaire or dynamically by switching which photoluminescent material is exposed/pumped in different states of a tunable laser based luminaire.

Reference now is made in detail to the examples illustrated in the accompanying drawings and discussed below. FIG. 1 depicts a laser-based luminaire 1, in high-level functional block diagram form. In the example, the luminaire 1 includes a laser light source 3, a holographic optical element 5 and a photoluminescent material 7. The holographic optical element (HOE) 5 has a hologram 6 optically coupled to the laser light source 3 and to the photoluminescent material 7. The hologram 6 is configured to distribute light received from the laser light source 3 as a pattern of light to the photoluminescent material 7. Optionally, the luminaire 1 may include an output optic or optical system 9 (shown in dashed lines), sometimes referred to as a secondary (2nd) optic/optical system with regard to some later illustrations.

The examples utilize laser projection from the hologram 6 provided on the element 5 to provide light output distribution and/or color characteristic(s) for a general, artificial illumination application of the luminaire 1. In general, a holographic optical element (e.g. element 5) is produced by imprinting a hologram on a surface of a suitable material, for example, an interference pattern varying in surface profile, index of refraction, density and/or opacity design to produce a desired three-dimensional light output field when appropriately illuminated. Such a hologram may be a two-dimensional pattern or a three-dimensional pattern formed on or in the holographic optical element. The material may be reflective or transmissive. FIG. 1 shows a transmissive holographic optical element 5 in that the projection of output light is via an output surface of the element 5 opposite the input surface (with the output of light forming a holographic projection having passed or been transmitted through the holographic optical element). Examples of luminaires using reflective holographic optical elements are described later.

The holographic optical element 5 carrying the hologram 6 may be a relatively small, light-weight component. The spot of the laser beam on the holographic optical element 5 may be less than 1 mm in diameter if round (or largest dimension if oval or the like). Hence, the hologram 6 may have an area around 1 $mm^2$, although larger or smaller holograms may be used.

A hologram 6 may be designed and imprinted on the substrate surface of the holographic element 5 in a variety of ways. It may be helpful to consider a particular example design technique. Computer aided design of the hologram 6 on the substrate surface of element 5 can produce a variety of selected optical processing capabilities. The substrate may be reflective or transmissive (e.g. substantially transparent). Various imprinted computer generated holographic images may be configured as beam splitters or distributors for sending light from an input beam in various patterned distributions, as lenses of particular properties, as light filters, as diffraction gratings, etc. In a beam splitter application, for example, a hologram 6 on element 5 distributes light from a laser beam in a specific pattern. For a luminaire application, design of the luminaire includes specification of a distribution pattern from the hologram 6, and a computer implemented hologram design procedure is used to generate a corresponding hologram 6 and imprint the hologram 6 on a suitable substrate of element 5, such that the hologram 6 is configured to distribute light from a laser beam in the specified pattern.

A laser beam produces a single spot of illumination, in this case on a region of a holographic optical element 5. Using a hologram 6 configured for beam splitting, the hologram 6 may be computer-designed to split the beam into any selected number of lower power beams directed in selected directions. More continuous distributions of light from the hologram 6 are also possible. The pattern of the directed light outputs from the holographic optical element 5 can have any shape that may be defined by configuration of the computer generated hologram 6, e.g. for a circular pattern of spots on a substrate supporting a phosphor, a rectangular or square array on such a substrate, rings of spots, etc. A beam splitting hologram also may be tailored to define the shape of each output beam, e.g. to produce a square spot, a trapezoidal spot, etc., instead of just round or oval spot. As a result, the distribution of light need not be limited to that provided by a round, rectangular or square array of point sources as in typical LED based luminaires or an array of emitters mounted on a flat circuit board.

The laser light source 3 can be any laser emitting device of sufficient power, which emits light of a nominal wavelength and light of wavelengths typically in a relatively narrow wavelength band around the nominal wavelength. For example, the laser light source 3 may be a gas laser, a fiber laser, a laser array, or one or more laser diodes. The laser source may also utilize second or higher order harmonic conversion.

The laser light source 3 is chosen to emit light of wavelength(s) to optically pump a particular type of photoluminescent material 7 so as to produce light output from the luminaire of a spectral power distribution (or other color characteristic) suitable for a particular illumination application of the luminaire 1. The combination of the particular laser light source 3 and photoluminescent material 7 also is engineered to provide an output intensity for the luminaire, as distributed over an intended output destitution, where the output intensity is suitable to the particular illumination application of the luminaire 1.

Laser light source 3 is configured to be driven by electrical power to emit the laser light toward the holographic optical element 5. The laser light source is driven, for example, by power from a laser light source driver (see 111 in FIG. 18) coupled to the laser light source 3 to selectively control the laser light source 3 to emit the beam directed to the holographic optical element 5. Although other laser light sources may be used, the examples herein typically utilize one or more laser diodes to implement the laser light source 3.

In many examples, the light from the laser light source 3 is a blue or ultraviolet laser beam, and the photoluminescent material 7 is a phosphor or mix of phosphors to convert the blue or ultraviolet light to longer wavelength light of wavelengths that together with some of the blue light appears to be white. Different phosphors or combinations of phosphors used to form the material 7 can produce white light of different color characteristics, e.g. different correlated color temperature (CCT), color rendering index (CRI), R9 etc., or to produce overall output light of a different non-white color characteristic.

A blue/ultraviolet laser light source 3 may be a laser diode fabricated with aluminum-indium-gallium-nitride-based (AlInGaN-based) semiconductors, which produce blue/ultraviolet light without frequency doubling. The laser light source 3 emits the laser beam toward the holographic optical element 5 with a nominal wavelength shorter than 500 nanometer (nm). For blue light emissions, the laser light may have a nominal wavelength between 445 nm through 465 nm, including the "true blue" wavelength of 445-450 nm. The 445-465 nm wavelength laser light is closer to the peak sensitivity of the human eye and therefore appears brighter than 405 nm violet laser diode light sources. However, in some examples, the laser light source 3 can be included in a luminaire 1 that emits electromagnetic radiation between 249-480 nm, which covers ultraviolet, violet or blue wavelengths. Electrically-pumped lasing from an AlGaInN-based quantum-well at room temperature can occur as low as the 249 nm wavelength. In some examples, laser light source 3 may emit electromagnetic radiation in the infrared wavelength. Typically, the laser light from source 3 forms a laser light spot incident on the input surface of the holographic optical element 5 in the shape of an oval shape with a Gaussian distribution.

A transmissive phosphor serving as the photolumiescent material 7, for example, may output illumination lighting with a correlated color temperature of around 5100 Kelvin white. Other correlated color temperature, from warm white to cool white, may be derived by tuning phosphor formula. The luminance of the transmissive phosphor when utilizing a laser light source 3 as the light pumping source can reach hundreds of candela/square millimeter, which is at least 10 times the luminance that a light emitting diode (LED) light source generates.

As noted, the luminaire 20 may include an output optic or optical system 9. The optical system may be a simple pass-through element, such as a relatively transparent plate, a filter, or the like; or the optical system 9 may be a lens, a holographic lens, an array of lenses, one or more mirrors, a grating, a lenslet film, or the like for providing a particular overall light output distribution from the luminaire 20 designed for the particular intended illumination application of the luminaire 20. A variety of examples of the optic 9 are shown in later drawings discussed in more detail below.

The laser-based luminaires disclosed herein may have one or more advantages over traditional solid state lighting using LEDs. Several potential advantages are discussed below by way of non-limiting examples.

The laser beam provides a smaller light spot output than an LED. As a result, processing of the beam allows use of more compact, lighter optics. Smaller optics may lower cost, and/or the luminaire may be lower in overall weight.

An LED based approach uses an array of LEDs spaced apart on a printed circuitry board. The shape of the board and the array determines the shape of the light supplied from the array. The spacing between the LEDs on the board may cause pixilation. By contrast, laser projection via a hologram can provide virtually any desired light distribution, as determined by the particular computer generated hologram. Also, the hologram may be designed to provide light distribution, e.g. onto the photoluminescent material, that is free of perceptible pixilation.

The shape of the distribution may be configured to conform to the intended design of a particular luminaire. For example, a hologram may be designed to provide a circular distribution for a circular luminaire (e.g. a circular downlight), a hologram may be designed to provide a square or other rectangular distribution for a square or other rectangular luminaire (e.g. a 2×2 luminaire or a 2×4 luminaire), a hologram may be designed to provide a triangular distribution for a triangular luminaire, etc.

The preceding shape examples are two dimensional distribution configurations. The laser projection, however, may also enable adaptation to desired three dimensional distributions. The LED approach typically requires a flat printed circuit board or sections of flat printed circuit boards, and such circuit board requirements complicate the design and manufacture of curved panel luminaire panel. The laser projection approach however is readily adaptable to a curved surface of the luminaire, e.g. of a phosphor substrate and/or an optical output surface of the luminaire. The LED light decreases in proportion to the square of the distance from each respective LED. Because it is coherent, a laser beam does not significantly disperse and therefore does not decrease in power density as rapidly as a function of distance from the emitter, particularly over the relatively short distances between the laser light source and the actual final output, as would be typical in luminaire architectures. Consequently, the light of the laser projection can be distributed over a desired flat or curved surface even if the plane or the curvature of the surface causes a variation in distance from the laser to points on the surface, without undesired differences in light intensity applied across the particular surface. Where differences are desirable, however, the hologram can be designed to provide different light intensity to different points or regions on the particular surface, regardless of uniformity or differences in distance from the laser light source.

In LED based luminaires, cost tends to be proportional to the number of LEDs. For example, more LEDs may be required for added intensity or for implementation of controllable distribution or controllable color characteristics/In addition to the cost of using more LEDs, increasing the number of LEDs requires more complex circuit board layout, more lead connections or traces on the board and more complex driver hardware to operate the increased numbers/channels of LEDs. Luminaires using a laser light source and a hologram are more readily adaptable to various luminaire designs and applications, in some cases, with only the need to change to a different computer designed hologram. Typically, a laser light source will utilize a smaller number of diodes than a LED based source, and the laser light engine scales to meet the requirements of a variety of applications without such a rapid increase in the number of emitter diodes.

FIG. 1 and many of the illustrations of the later examples show luminaries oriented so that the overall light emissions are directed generally downward into a space to be illuminated. Such a downlight configuration, for task lighting or other similar general illumination applications, is given only as a non-limiting example. Light fixtures or other types of luminaires in the examples may be at any location and/or orientation relative to the space, structural surfaces or any objects or expected occupants to support a desired general lighting application appropriate for the usage or purpose intended for the space that will be illuminated. For example, downlight fixtures provide direct lighting from above. As other examples, indirect lighting may reflect light off of a ceiling or wall surface, or the lighting may principally illuminate an object in the room to be viewed by the occupants. As another example, a wall wash or wall grazing application might utilize a luminaire directed downward or upward at an angle relative to a surface of the wall of the like that a luminaire is intended to illuminate.

FIG. 2 shows a somewhat more detailed example of a laser-based luminaire 20. As discussed earlier, the laser light source may be any suitable laser light emitting device or combination of devices, such as a gas laser, a fiber laser, a laser array, or one or more laser diodes. The laser source may also utilize second or higher order harmonic conversion. In the example of FIG. 2, the source emits blue or ultraviolet (UV) laser light.

For convenience of illustration and discussion of this example, the tunable laser based luminaire 20 includes a laser light source in the form of a laser diode 23. The luminaire 20 also includes a transmissive holographic optical element (HOE) 25 having a diffractive hologram imprinted on a surface of the transmissive material of the holographic optical element 25. The hologram is configured to divide a beam of light from the laser diode 23 of the light source into predetermined pattern of light.

The hologram may split the light into a pattern of differently directed beams (represented by arrows in different angular directions). The hologram on element 25 may produce beams of different relative intensities, as shown in FIG. 2, where arrows of different dot or dash formats represent beams of different intensities. In the simplified example, the beams represented by the two arrows shown with small dots may have substantially the same relatively higher intensity, the beams represented by the two dashed arrows may have substantially the same moderate intensity, and the beam represented by the dashed-double dotted arrow may have a relatively lower intensity. Although not shown in FIG. 2, the hologram may produce beams of approximately the same relative intensity (as represented by the solid arrows in later drawings). In the example state of FIG. 2, the different beam intensities may provide different output illumination intensities across the output surface of the luminaire 20, whereas the relatively similar beam intensities in later examples may produce a more uniform output illumination intensity across the output surface of the luminaire 20. The numbers and intensities of the beams in the pattern from the hologram are given by way of non-limiting examples, and other numbers and/or relative intensities may be produced by an appropriate computer generated hologram adapted for a particular illumination application of a particular luminaire design.

The example luminaire 20 of FIG. 2 also includes at least one phosphor bearing substrate 31. The phosphor(s) in this example act as photoluminescent material(s) when exposed to blue or ultraviolet light generated by the laser diode 23 and distributed by the hologram on holographic optical element 25. The drawing shows phosphor on a single substrate or plate 31, although phosphor may be provided on multiple substrates at the appropriate locations. Also, this first example with a phosphor bearing substrate shows a flat phosphor plate as the substrate 31, the substrate may have any curvature that may be desirable for a particular general illumination application; and several curved examples will be discussed later.

Figure 15:
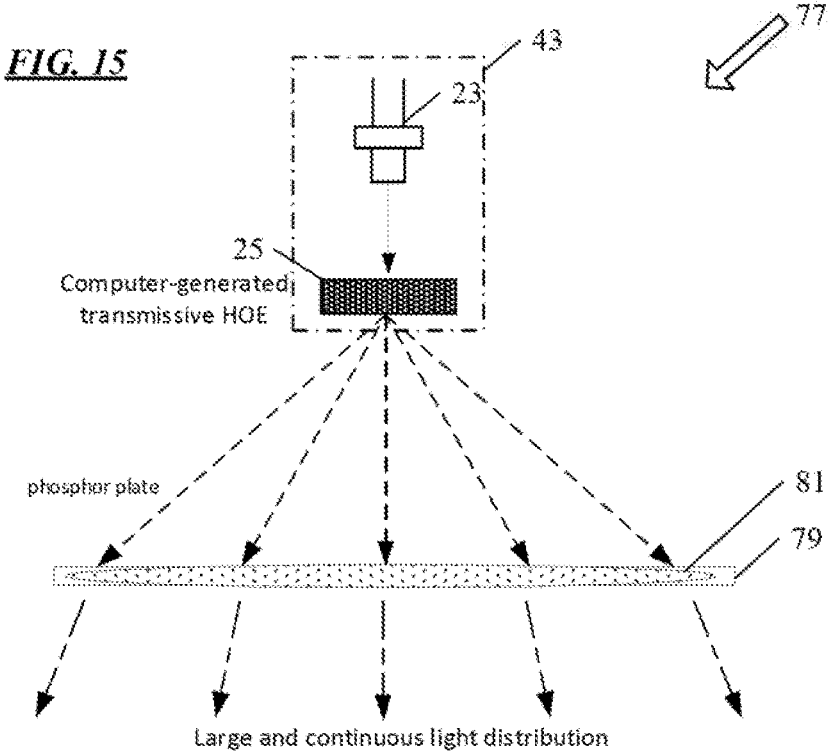
FIG. 15 is a side/partial cross-sectional view of another example of a laser-based luminaire, having a flat phosphor and flat plate type substrate/optic.
Figure 16:
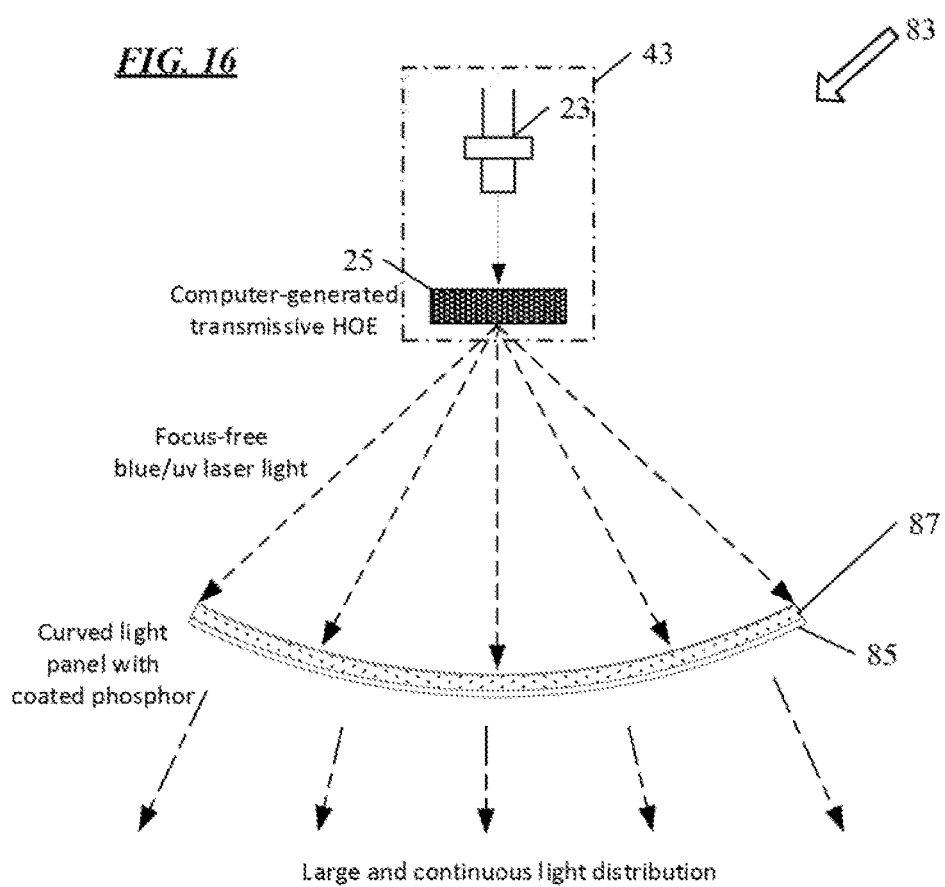
FIG. 16 is a side/partial cross-sectional view of another example of a laser-based luminaire, having a curved substrate/optic and phosphor.
Figure 17:
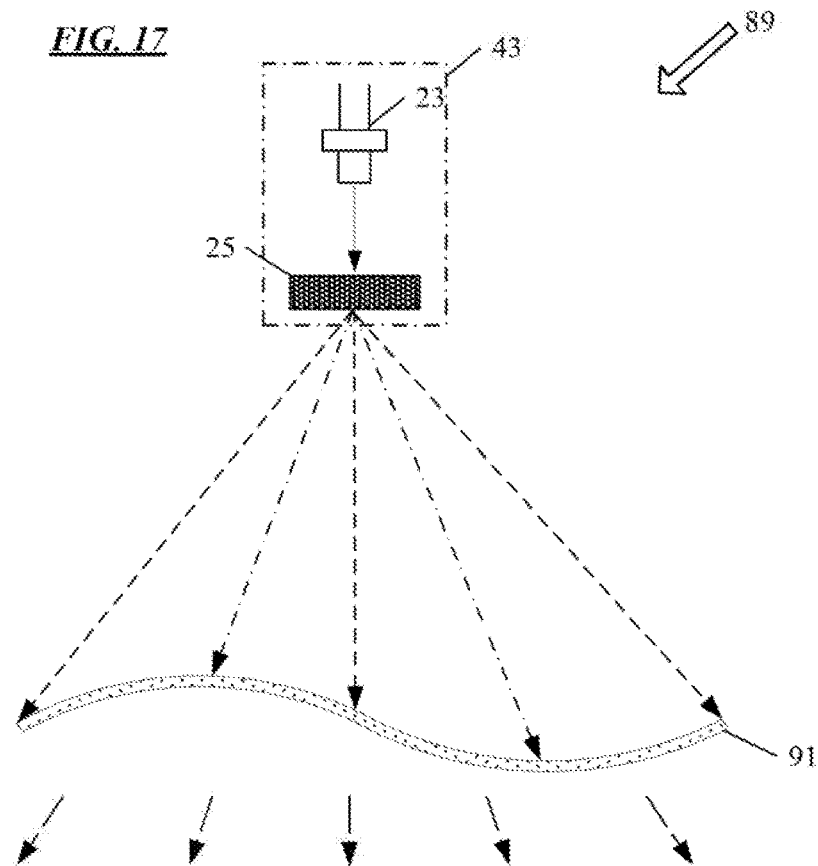
FIG. 17 is a side/partial cross-sectional view of another example of a laser-based luminaire, having a more complex curved substrate/optic and phosphor.

The phosphor may be implemented as a single broad-area region across the substrate (see e.g. FIGS. 15 to 17). In the illustrated example of FIG. 2, however, the luminaire 20 has the phosphor region 35 separated into relatively small sub-regions at appropriate locations on the substrate 31 to receive the split beams from the pattern provided by the hologram on holographic optical element 25.

Optionally, the example luminaire 20 of FIG. 2 may include a 'secondary' (2nd) optical system 37 coupled to the photoluminescent material, i.e. to the phosphor region 35 in the illustrated example. The illustrated example utilizes individual lenses, shown generally in the shape of parabolic total internal reflection (TIR) lenses. The lenses 39 of the optical system 37 are coupled to the sub-regions of phosphor region 35. The lenses 39 forming the optical system 37 may be substantially similar (as shown for convenience). Alternatively, the lenses 39 forming the optical system 37 may provide different light output distributions and/or other differences in optical performance to tailor the overall light output from the luminaire 20 to an intended general illumination application.

An optical support structure 41 holds the example lenses 39 of the optical system 37 in place, in an assembly together with the sub-regions of phosphor type photoluminescent material 35 on the substrate 31, to provide suitable optical coupling of converted light from the phosphor(s) and blue light if any from the patterns that may pass through the phosphor(s) to the lenses 39. The structure of the optic support 41 will depend on the particular structure of the lenses or the like that form the optical system 37 and/or structure(s) of the substrate and photoluminescent region or sub-regions.

The laser diode(s) 23 of the light source and the holographic optical element 25 may be integrated in a unified module or contained together in a housing, as generally represented by the dotted line box 43 encompassing the laser diode 23 and holographic optical element 25. In such a module or housing 43, the only optical path for light to exit may be through the holographic optical element 25, for example, to prevent emission of the laser beam without dispersal by a hologram on the holographic optical element 25. The holographic optical element 25 distributes the laser radiance to a wider distribution with a radiance level output from the holographic optical element 25 that may be about the same as the radiance level output by a light emitting diode (LED). For safety, the module or housing 43 may be frangible is some way so that the laser diode 23 becomes inoperative if the module or housing is damaged so as to emit light via another path or if the holographic optical element 25 is removed.

It may be helpful to consider a possible configuration for an example of a luminaire like that of FIG. 2 suitable for a particular general illumination application. This example uses blue laser light. Currently available GaN-based blue laser diodes provide 50 lm/W via blue-pumped phosphors. For a two-inch downlight application, a luminaire should produce about 500 lumens (lm) of white light output. The laser based luminaire therefore can have a small number of laser diodes to produce that output that draw minimum of 10 W of electrical power.

In the design example, the hologram might distribute the light from two blue laser diodes to fifty-two light phosphor spots, e.g. distributed in three, four or more concentric rings on a circular phosphor plate in several of the examples in the later drawings. On average, from the distributed blue pumping light, each phosphor spot would produce a luminous flux of 10 lm, for a total light output from the phosphors of 520 lm.

A suitable phosphor, for example, might be a metal-halide perovskite type quantum dot (QD) phosphor of an appropriate mixture to produce white light of a selected color characteristic in response to blue light. Other photoluminescent materials may be used.

The phosphor spots may be smaller in size but there may be a larger number of spots. Such an approach may allow use of smaller (lighter and/or cheaper) optics coupled to the spots. Another approach might distribute the phosphor uniformly across a plate or a non-flat substrate.

With the example laser based downlight, there are only two controlled emitters, i.e. the two laser diodes. The printed circuit board for the luminaire light source only needs to be large enough to mount and provide connections to the two laser diodes and to aim the laser beams at the appropriate spot or spots on the holographic optical element. Also, the power supply circuitry only needs to control the two laser diodes. As laser diodes continue to improve, it may be possible in the near future to implement the example downlight with single blue laser diode. For general illumination applications that may require higher luminous flux in the distributed luminaire light output or if there is a reason to utilize particular laser diodes of lower individual power, a downlight or other type of luminaire may utilize three or more laser diodes.

A hologram, as used in the examples, may provide beam splitting via holographic diffraction of a coherent source, in the example, diffraction of a laser beam from a laser light source. The hologram is essentially a diffraction grating tailored to process light in a particular wavelength range. The irradiance of diffracted light on the photoluminescent material can be controlled by level of constructive interference provided by the particular design of the hologram grating. One holographic grating pattern determines one diffraction pattern for one intended split-beam light distribution.

For a general illumination application, the distribution of light from the hologram may be configured to provide a two dimensional or three dimensional distribution suited to a particular configuration of the photoluminescent material and/or to the optical system at the output of the luminaire. In some simple cases, even a one dimensional distribution may suffice.

For purposes of discussion of an example of computer generation of a hologram for a luminaire, we will consider the one dimensional case; but it should be appreciated that the technology is readily adaptable to producing holograms for desired two dimensional and three dimensional distributions. For the simple one dimensional hologram, aspects of the hologram that may be adjusted in the design process to provide an intended distribution include grating material, spacing, height, shape, etc.

For any application, including for an illumination application, a light distribution is selected that is suitable for the application. For example, in a luminaire, a phosphor plate and/or optical system may be designed for the application; and a distribution may be determined to provide beams of light to selected locations on the phosphor substrate. The manufacturer of the holographic optical element runs a computer simulation program to determine the grating material, spacing, height, shape, etc. that will provide the diffractive beam splitting of the particular nominal wavelength of the laser light source so as to produce the specified light distribution from the hologram. The hologram design may also take into account expected angle of incidence of one or more laser beams expected to illuminate the particular hologram, e.g. two or more beams having different angles of incidence on the hologram. The resulting interference grating designed via the computer program is then imprinted on the substrate material of the holographic element.

As noted, this approach to computer aided design can be expanded to provide two dimensional or even three dimensional light distribution from the hologram, and the light distribution generated by the holographic optical element will exhibit relatively high optical efficiency. A coherent light source, such as a laser light source, is highly effective for distribution of light via a holographic optical element, since little or no dispersion happens (no other colors and same incident direction) between the source and the holographic optical element.

A variety of materials, such as various types of glass, may be used as a substrate for the photoluminescent material. By way of a specific example, a photoluminescent material may be provided on a light transmissive plastic substrate, similar to a sheet material utilized for a light guide. The plastic sheet substrate may be coated with a uniform phosphor or coated with phosphors at appropriate sub-regions. The substrate may be flat or contoured (e.g. curved) in one, two or three dimensions. An example of a suitable photoluminescent material is metal-halide perovskite QD phosphor. Such a phosphor may be sprayed via a nozzle on a relatively large panel of a luminaire. The panel can be masked for several phosphor regions. The particular type of phosphors in the example may be pumped by UV or blue light.

In an example in which the holographic optical element distributes the light to a cumulative area greater than the initial laser beam spot size (e.g. larger single area or number of spots together having a larger total area) on the photoluminescent material, the light intensity and heat at any particular location on the substrate is much lower than the power of the laser beam itself. The lower light intensity and heat allows use of a wider variety of photoluminescent materials including some that may not be suitable to direct irradiance by a laser beam of the power levels discussed here for illumination applications.

Although shown as individual lenses, because of the small spot sizes from the split beams and the corresponding phosphor sub-regions, the optical system may be implemented as an optical film with features of the film suitably sized and shaped to perform the functions of the lenses shown by way of examples in the drawings.

FIG. 3 illustrates another example of a laser and hologram based luminaire 51. In this example, the luminaire 51 includes a laser light source in the form of a laser diode 53, although as in the other examples discussed herein, other laser sources may be used. The diode 53, for example, may be a blue or ultraviolet laser diode.

The luminaire 51 also includes a holographic optical element (HOE) 55 optically coupled to receive a beam of light from the laser diode 53. The holographic optical element 55 carries a hologram (not separately shown) similar to those of the earlier examples. The holographic optical element 55 in this example, however, is a reflective holographic optical element (rather than transmissive as in the earlier illustrated examples). The use of a reflective holographic optical element may be beneficial in that some available reflective holographic optical elements can endure exposure to higher laser irradiance with little or no degradation or damage, in comparison to currently available transmissive holographic optical elements. As shown in a later example luminaire with a reflective holographic (FIG. 7), addition of one or more mirrors or the like in the laser path(s) allow beam-folding for a more compact/thinner optical system; and a similar approach may be utilized in a variation of a luminaire otherwise the same as luminaire 51 of FIG. 3.

The luminaire 51 includes a phosphor material 57 (as an example type of photoluminescent material) and a secondary optic 59. The hologram on reflective holographic optical element 55 projects a pattern of light obtained from the beam from laser diode 53 on the phosphor material 57. The pattern of the projection on the phosphor material is determined by the hologram on the element 55. The phosphor material 57 may be any of the types of phosphors for particular luminaire applications discussed relative to the earlier examples.

Although other optics may be used, the example luminaire 51 has a single unified optic 59 coupled to the entire area of the phosphor material 57. The optic 59, for example, may be a single lens or reflector. If made of a solid transmissive material, a surface of the optic 59 may act as a substrate to support the phosphor material 57. The pattern of illumination of the phosphor 57 by the projection from the hologram of element 55 together with the light distribution properties of the particular design of the optic 59 determine the angular distribution of the overall output of the luminaire 51.

FIG. 4 shows an example luminaire 51' similar to the luminaire 51 FIG. 3; and the same reference numbers are used to identify the elements of luminaire 51' that are structured and function in essentially the same ways as the similarly numbered elements of luminaire 51.

The luminaire 51' includes an additional filter 56 between the holographic optical element 55 and the phosphor material 57. The filter 56 is an optical element configured to pass light at least of the wavelengths included in the beam from the laser diode 53 (e.g. in a blue wavelength range or in an ultraviolet wavelength range) as split and/or distributed by the hologram on element 55 toward the phosphor material 57. The filter 56 also is configured to reflect at least some light produced by the phosphor material 57 that may be emitted from material 57 toward the holographic optical element 55. The filter 56 reflects such light back through the phosphor material 57 toward the luminaire output (e.g. through the optic 59). The light reflection provided by the filter 56 improves the output efficiency of the luminaire 51'.

In an example luminaire using a blue laser light diode 53, the filter 56 may be a dichroic filter configured to pass blue light received in the direction from the holographic optical element 55 and reflect yellow light produced by the phosphor material that the filter may receive in the direction from the material 57. In another approach, the filter 56 may be a holographic spectral selective mirror oriented to pass light coming in the direction from the holographic optical element 55 and reflect light of the phosphor emission spectrum from the phosphor material 57 back toward the material 57 and the output of the luminaire 51'.

Although shown in only the one drawing for convenience, a filter like filter 56 of FIG. 4 may be provided in any of the other examples described herein.

FIGS. 5 and 6 show two versions 51a and 52b of a luminaire similar to the luminaire 51 FIG. 3; and the same reference numbers are used to identify the elements of luminaires 51a and 51b that are essentially the same as the similarly numbered elements of luminaire 51. For example, each of the luminaires 51a, 51b includes the laser diode 53, the phosphor material 57 and the optic 59. Each drawing shows an enlarged detail view of the surface of the phosphor material 57. The drawings show a disc-shaped phosphor material 57, for convenience; although the phosphor material 57 may have other shapes.

Each of the luminaires 51a, 51b has a holographic optical element 55a or 55b, however, the luminaires 51a and 51b have different holograms on the respective holographic optical elements 55a, 55b. The hologram on element 55a is configured to provide a first projection 58a on the phosphor material 57 (enlarged detail shown in FIG. 5), and the hologram on element 55b is configured to provide a different second projection 58b on the phosphor material 57 (enlarged detail shown in FIG. 6). As shown in these examples, a hologram may enable a laser based luminaire to more readily provide an asymmetric light distribution for a particular general illumination application.

For a wall wash application or the like, it may be desirable for a luminaire like 51 to produce a light distribution on a wall or other architectural panel that a person would perceive as relatively uniform, as shown in FIG. 5. For that purpose, the hologram on element 55a is configured to provide a keystone and somewhat graded projection 58a of blue or ultraviolet light from the laser beam onto the phosphor material 57. The resulting converted light from the phosphor material 57 is directed through the optic 59 for the desired uniform wall illumination or the like. Where the illuminated surface of the wall is nearer to the luminaire, the hologram provides light over a wider area of the phosphor but at a lower intensity; whereas for areas down the wall and further from the luminaire, the hologram provides light over a wider area of the phosphor but at a progressively higher intensity, such that the overall illumination of the wall surface appears substantially uniform (e.g. the intensity on the wall is uniform or is free of gradient irregularities that might otherwise appear as striations).

For a different application, it may be desirable to have a different light output distribution. The intended luminaire output distribution may be any of a variety of arbitrary distributions, as represented by the example output distribution in FIG. 6, which a designer or manufacturer deems suitable to a particular general illumination application. For that purpose, the hologram on element 55b is configured to provide a corresponding arbitrarily shaped and/or graded projection 58b of blue or ultraviolet light from the laser beam onto the phosphor material 57. The resulting converted light from the phosphor material 57 is directed through the optic 59 for the desired selected luminaire output light distribution.

Figure 8:
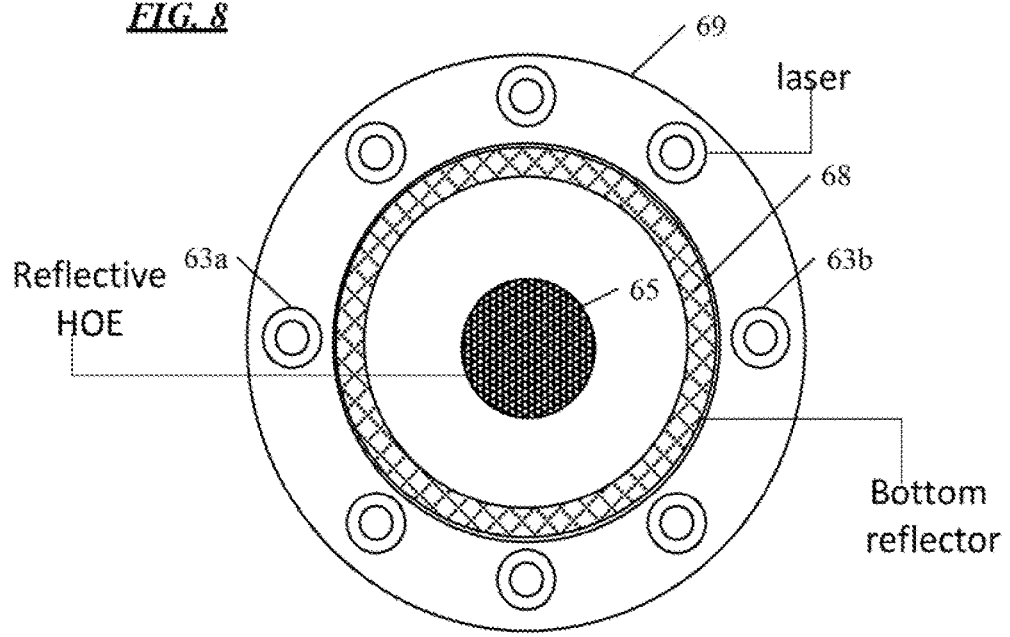
FIG. 8 is a plan view of several components as might be used in a luminaire similar to the example luminaire of FIG. 7.

FIGS. 7 and 8 relate to another example luminaire 60, which utilizes a reflective holographic optical element and has two or more laser diodes as the laser light source. FIG. 7 is a side/partial cross-sectional view of the laser-based luminaire 60; and FIG. 8 is a plan view of some of the components of the luminaire 60 of FIG. 7.

The luminaire 60 includes at least two laser diodes 63a, 63b and may include one or more additional laser diodes. The plan view of FIG. 8 shows eight laser diodes by way of a non-limiting example, includes the laser diodes 63a, 63b.

The luminaire 60 includes holographic optical element 65. In this example, the holographic optical element 65 is a reflective holographic optical element. The holographic optical element 65 has a hologram imprinted on a reflective surface of the element 65 to disperse the light from the lasers in an appropriate pattern. The properties of the hologram are similar to those of holograms discussed with regard to the earlier examples. As mentioned earlier, use of a reflective holographic optical element may be beneficial in that some available reflective holographic optical elements can endure exposure to higher laser irradiance with little or no degradation or damage, in comparison to currently available transmissive holographic optical elements.

The laser diodes 63a, 63b may be aimed to directly emit laser beams toward the reflective surface of the holographic optical element 65, similar to the aiming of the lasers in the luminaire examples of FIGS. 3 to 6. In the example of FIGS. 7 and 8, however, the luminaire 60 includes one or more mirrors to reflect the laser beams to the appropriate location on the holographic optical element 65. There may be one mirror reflection, two mirror reflections or more mirror reflections in the path between each laser diode and the holographic optical element 65, depending on design parameters of the particular luminaire configuration (e.g. size and shape of the luminaire and/or number of laser diodes chosen to provide the appropriate output intensity for a particular illumination application). The example in these drawings includes two mirror reflections in the path between each laser diode and the holographic optical element 65.

For ease of illustration, the view in FIG. 7 shows two individual mirrors in each beam path. The laser diode 63a emits its beam toward mirror 67a, the mirror 67a reflects that beam to the mirror 68a, and the mirror 68a reflects the beam to the holographic optical element 65. Similarly, the laser diode 63b emits its beam toward mirror 67b, the mirror 67b reflects that beam to the mirror 68b, and the mirror 68b reflects the beam to the holographic optical element 65.

These mirrors may be individual components or may be formed in other ways. In a circular arrangement, for example, the mirrors 67a, 67b may be respective areas of a ring-shaped mirror. Similarly, the mirrors 68a, 68b may be respective areas of another ring-shaped mirror, such as the mirror 68 shown (as if in front of the plate 69) in the view of FIG. 8 looking toward the holographic optical element. For optical efficiency, the mirrors may be highly reflective with little or no dispersion of the reflected light (e.g. substantially specular), at least for light of the wavelengths emitted by the particular type of laser diodes.

The laser diodes may be supported in any suitable manner. In the example of FIG. 8, the laser diodes are supported at equally spaced locations around a ring-shaped plate 69 formed of a suitably heat resistant material (e.g. aluminum, etc.). In the plan view, the reflective surface of the holographic optical element 65 is visible through the central opening through the support plate 69. The plate or other structure(s) to support the laser diodes and the various mirrors is/are omitted from FIG. 7 for convenience.

Although other arrangements of photoluminescent material(s) and/or secondary optics may be utilized in various implementations of a luminaire like luminaire 60, the illustrated example (FIG. 7) includes an arrangement similar to that used in the luminaire example FIG. 2; and the same reference numbers are used to identify the elements of luminaire 60 that are structured and function in essentially the same ways as the similarly numbered elements of luminaire 20.

Hence, the luminaire 60 includes at least one phosphor bearing substrate 31, and the phosphor(s) 35 that act as photoluminescent material(s) in this example are separated into relatively small sub-regions at appropriate locations on the substrate 31 to receive the split beams from the pattern provided by the hologram on holographic optical element 25. Optionally, the example luminaire 60 of FIG. 7 may include a 'secondary' (2nd) optical system 37 coupled to the photoluminescent material, i.e. to the phosphor(s) in region 35 in the illustrated example.

Although other optics may be used as outlined above, the illustrated example utilizes individual lenses, shown generally in the shape of parabolic TIR lenses 39, as in the earlier example of FIG. 2. The lenses 39 of the optical system 37 are coupled to the sub-regions of phosphor region 35. An optical support structure 41 holds the example lenses 39 of the optical system 37 in place, in an assembly together with the sub-regions of phosphor type photoluminescent material 35 on the substrate 31, to provide suitable optical coupling of converted light from the phosphor(s) and blue light if any from the pattern that may pass through the phosphor(s) to the lenses 39. Other aspects and/or alternative implementations of the arrangement of the substrate, the photoluminescent material, the lenses or other optics and the support structure should be readily apparent from the discussion of FIG. 2 above and/or other later luminaire examples.

FIGS. 9 to 12 are plan views of different example arrangements of phosphor type photoluminescent materials as regions on differently shaped examples of substrates. The shapes of the substrates and the shapes and arrangements of the phosphors in these examples, however, are shown by way of non-limiting examples. In these examples, it is assumed that the substrates are flat, e.g. with a planar surface in the plane of the drawing sheet. The substrates, however, may be curved in a dimension orthogonal to the plane of the drawing sheet.

Figure 9:
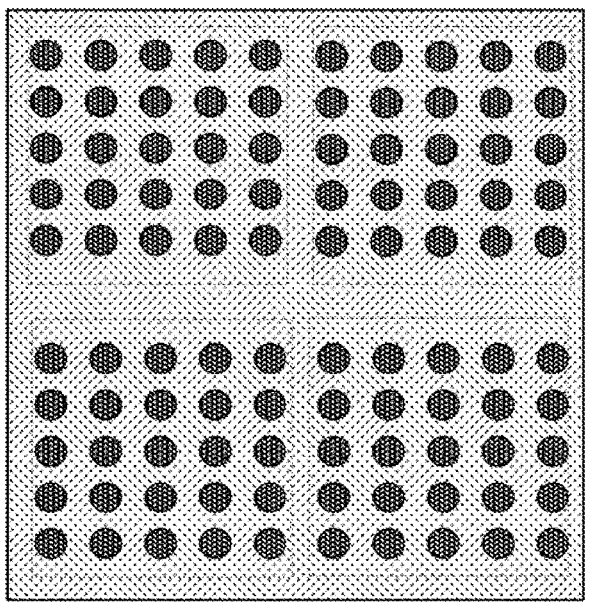
FIGS. 9 to 12 are plan views of different arrangements of phosphor type photoluminescent materials as regions on differently shaped examples of substrates.
Figure 10:
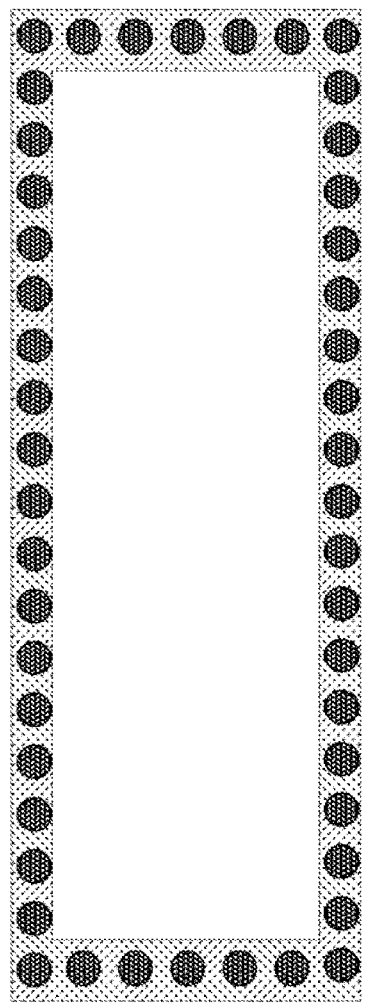

FIG. 9 shows a square array of phosphor spots, as sub-regions of photoluminescent materials, as might be used in a 2×2 luminaire. FIG. 10 shows a somewhat arbitrary rectangular arrangement with a pattern of phosphor spots around the perimeter of the rectangular substrate. The region inside the rectangular arrangement of phosphor spots may be empty or filled by a portion of the substrate or other material and may or may not be transparent.

Figure 11:
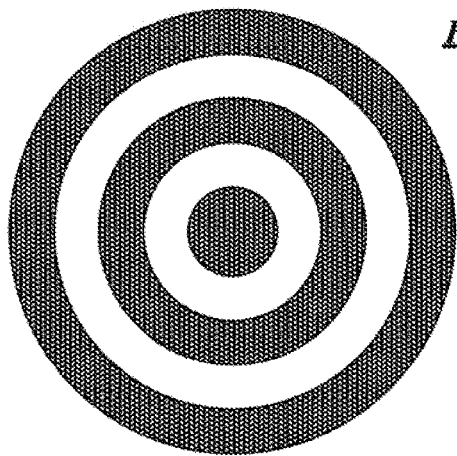
Figure 12:
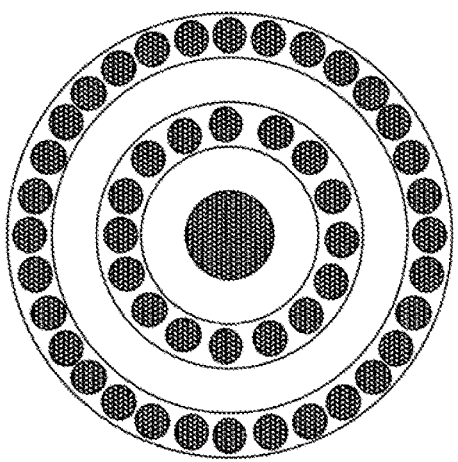

FIGS. 11 and 12 show circular arrangements of phosphors on circular substrates, as might be utilized in circular downlight or spotlight applications. In the example of FIG. 11, the phosphor materials are arranged in concentric circles; and in the example of FIG. 12, the phosphor materials are arranged in concentric rings of phosphor spots.

The numbers of rings or phosphor spots in the examples of FIGS. 9 to 12 are given for ease of illustration only. Actual luminaires may utilize fewer or more regions or sub-regions of photoluminescent materials. In each case, the hologram in the luminaire would be computer designed to distribute the light split from the laser beam to the regions or sub-regions of photoluminescent materials.

Figure 13:
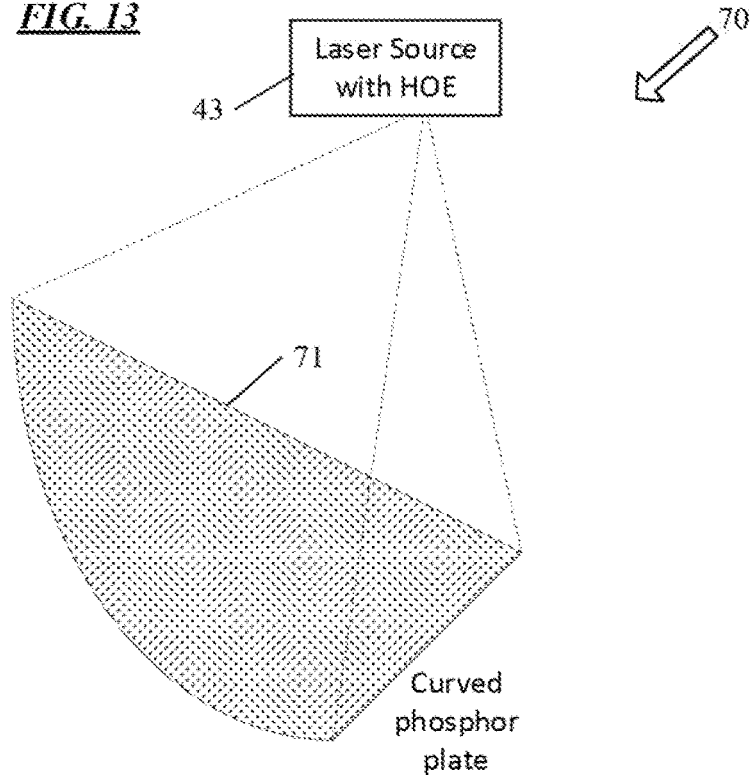
FIG. 13 is a partial block diagram/partial isometric view of a luminaire including a laser light source and holographic optical element together with a curved phosphor-bearing plate.
Figure 14:
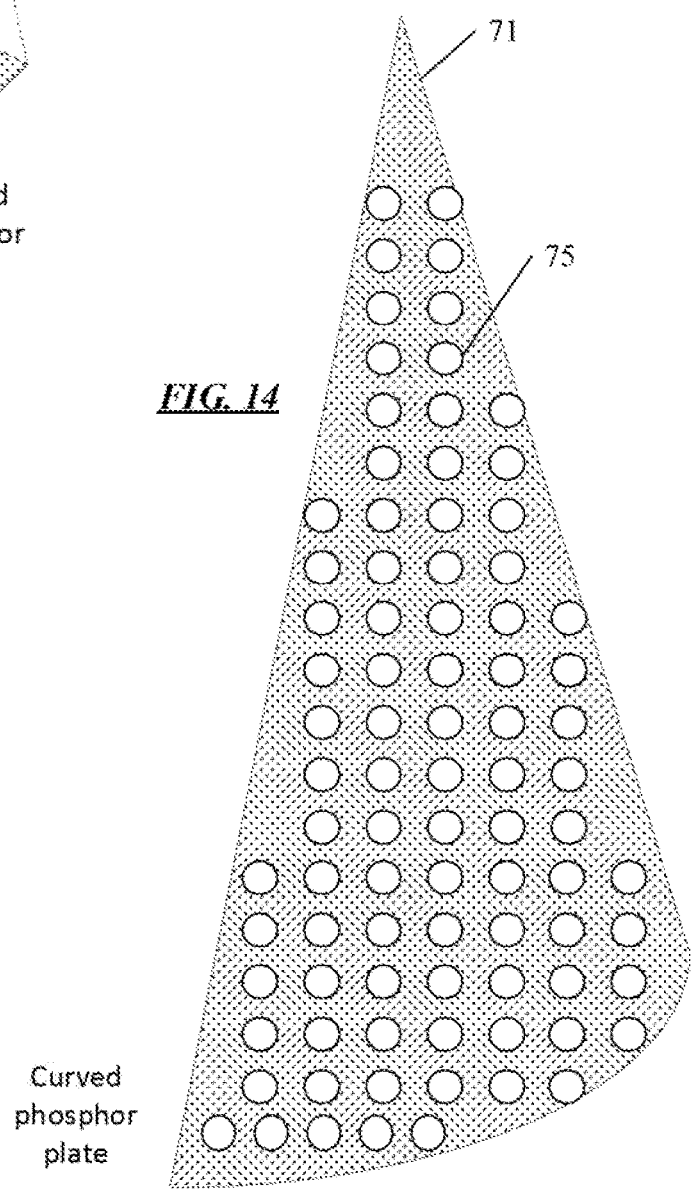
FIG. 14 is a somewhat enlarged isometric view of the curved phosphor-bearing plate of the example luminaire of FIG. 13 that also shows an example arrangement of phosphor spots on the curved substrate of the plate.

The examples shown to this point have represented relatively flat arrangements of the photoluminescent material, e.g. on a flat or planar surface of a substrate or the like. As noted earlier, the laser and hologram based luminaire technology may function with luminaire components for the photoluminescent materials and/or the output optics/surface of the luminaire that may be curved. FIG. 13 is a partial block diagram/partial isometric view of an example luminaire 70 including a curved phosphor-bearing plate; and FIG. 14 is a somewhat enlarged isometric view of the curved phosphor-bearing plate.

As noted earlier, the laser diode(s) of the light source and the holographic optical element may be integrated in a unified module. Although applicable to other arrangements, such as that shown in FIGS. 7 and 8, consider a module 43 as in FIG. 2 by way of an example, here. Such a module 43, shown as a single combined elements for convenience, includes the laser diode and holographic optical element. Such a module may be used with different substrates (e.g. flat or curved) for the photoluminescent material and/or with different optical systems.

In some cases, the hologram in such a module 43 may not necessarily be changed from that for a flat plate (e.g. as in FIG. 2) with a similar perimeter, for example, in luminaires where curved substrates (e.g. FIGS. 13 and 14) carry or are coated with a relatively continuous photoluminescent material (e.g. later FIGS. 15 to 17). In other cases, e.g. if the distribution needs to be changed to direct light to a substantially different set of locations of phosphor sub-regions or provide a different output intensity profile, for a different luminaire design or application, the module 43 only needs to have a different hologram imprinted on the holographic optical element.

In the example of FIG. 13, the module 43 would include a holographic optical element on which the hologram is computer-designed to split and distribute light of the laser beam in a somewhat triangular distribution in two dimensions, and that may also have a variation in a third dimension. The hologram is tailored to distribute the light to a curved region of photoluminescent material. In the example, the luminaire 70 includes a curved phosphor plate 71. As shown in FIG. 14, the photoluminescent material is formed as phosphor spots 75 distributed across the curved plate 71, although a uniform distribution of photoluminescent material across the plate 71 may be used for some general illumination applications.

It should be apparent that the laser diode(s) of the light source and the holographic optical element may be utilized with flat or curved arrangements, and many of the examples depicted the photoluminescent materials as phosphor spots. As noted, the photoluminescent materials may be distributed as a relatively uniform layer exposed to distributed light from the hologram. FIGS. 15 to 17 show several examples using phosphor layers.

Although applicable to other laser and hologram arrangements, such as that shown in FIGS. 7 and 8, consider a module 43 as in FIG. 2 by way of an example here, for discussion of FIGS. 15 to 17. Such a module 43 includes the laser diode 23 and holographic optical element 25 as discussed above. Such a module may be used with different substrates (e.g. flat as in FIG. 15, curved as in FIG. 16 or having a wave as in FIG. 17) for the photoluminescent material and/or with different optical systems. In some cases, the hologram may change for different phosphor and/or substrate arrangements, e.g. if the distribution needs to be changed to direct light to a substantially different set of phosphor sub-regions in a different luminaire design. In other cases, e.g. where differently shaped substrates carry or are coated with a relatively continuous photoluminescent material, it may not even be necessary to change the hologram to use the module 43 with in a different luminaire design.

Hence, FIG. 15 shows a luminaire 77 with a substantially flat phosphor plate 79. The light distribution from the particular hologram on element 25 distributes the light to a relatively uniform phosphor region 81 on plate 79. The light distribution may be substantially uniform or have varying intensities across the phosphor region 81, as required for a particular intended general illumination application of the luminaire 77. Although not shown for convenience, the luminaire 77 may include an output optical system coupled to process light from the phosphor layer 81, for example, a suitable optical film on the output surface of the phosphor plate 79. The example luminaire 77 provides a large continuous light output distribution.

In addition to the module 43 with the laser diode(s) 23 and the holographic element 25, the example luminaire 83 of FIG. 16 has a curved light panel formed of a curved substrate 85 and a phosphor layer 87. For example, the substrate 85 may be a curved sheet of a material sometimes used for a light waveguide or the like, and the phosphor layer 87 may be coated on the curved sheet. Although not shown, an optical film or the like may be provided on the output surface of the curved sheet. The example luminaire 83 also provides a large continuous light output distribution.

The cross-section of the curved sheet 85 and the curved phosphor coating 87, of the curved light panel, are illustrated as having curvatures corresponding to sections of concentric circles (curved in the plane of the drawing sheet). A similar luminaire may have a sheet and phosphor coating that also curve in an orthogonal dimension (perpendicular to the plane of the drawing sheet), for example, in which the curved sheet 85 of the light panel and the curved phosphor coating 87 have spheric curvatures (corresponding to sections of concentric spheres). More complex curved structures, for example having different curvatures in different dimensions, may be used for desired illumination applications and/or for aesthetic design considerations.

In addition to the module 43 with the laser diode(s) 23 and the holographic element 25, the example luminaire 89 of FIG. 17 has a wavy photoluminescent material 91. Depending on the material utilized, the material 89 may be self-supporting or supported by an appropriately shaped substrate (not shown). The wavy contour in the planar cross-section is given by way of a simple example. The wavy photoluminescent material 91 may have more complex contours.

Figure 18:
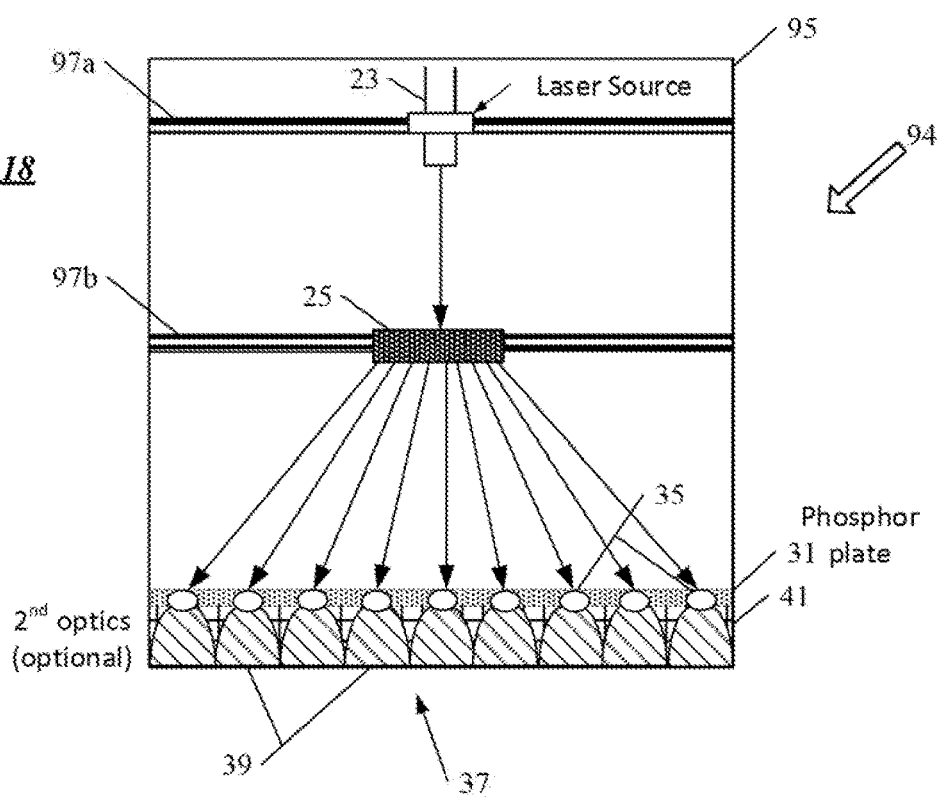
FIG. 18 is a cross-sectional view of a luminaire arrangement with a housing and chassis supports, useful in understanding several techniques to enhance safety of a laser-based luminaire.

FIG. 18 is a cross-sectional view of a luminaire arrangement with a housing and chassis supports, useful in understanding several techniques to enhance safety of a laser-based luminaire. For discussion purposes, the luminaire 94 includes, by way of example, elements 23, 25, 31, 35, 37, 39a and 41 of the example luminaire shown in FIG. 2, although similar safety enhancements may be provided in others of the luminaire examples described above.

The luminaire 94 includes an overall housing 95 that, together with the plate 31, fully encloses the laser light source (e.g. laser diode(s) 23) and the holographic element 23. The plate 31 and the support 41 for the lenses or the like of the secondary optical system 37 are attached to the sidewall(s) of the housing. The housing 95 is sealed with respect to light emissions and the coupling of the housing 95 to the plate 31 permits light output only through the plate 31, the phosphors or other photoluminescent material(s) on the plate 31, and the secondary optical system 37, for example, to prevent leakage of the laser beam.

The luminaire 94 also includes chassis elements 97a and 97b, attached to the interior of the housing 94, which support the internal elements 23 and 25 of the luminaire 94. The chassis element 97a is configured to provide heat dissipation. For example, the chassis 97a may be configured as or coupled to a heat sink.

The holographic optical element 25 distributes the laser radiance to a wider distribution, and the radiance level output in any one direction from the holographic optical element 25 may be about the same as the radiance level output by a light emitting diode (LED). As a result, light from the holographic optical element 25 would have a similar intensity level and similar level of risk as the output of an LED used today in a typical LED based luminaire. At this point in the system, the light is no longer at the higher, potentially harmful level originally output from the laser diode 23 or the like.

Also, the conversion by the phosphor or other photoluminescent material(s) on the plate 31 produces a wider range of wavelengths and scatters the resultant light including any blue or UV light. Hence, the conversion tends to reduce spectral energy density and to further reduce spatial energy density.

As an added layer of protection, it may be desirable to use a short-pulse laser operation, e.g. to mitigate any heat accumulation on an organism that might be impacted by the laser beam if other protection measures fail. The pulse duration would be short enough so that the average pulse exposure of human tissue (e.g. skin or eye) to the laser beam is low enough to minimize or prevent long term damage to such tissue. For example, if a human eye is exposed to the laser beam, the eye has some time to recover between pulses of the laser beam. An example ON time of a laser pulse may be around one nanosecond or a few nanoseconds. Also, if blue laser diodes are used, the strong laser light would be visible, and long term exposure could be avoided by a person in the vicinity before the accumulated dosage of too many pulses becomes dangerous.

Figure 19:
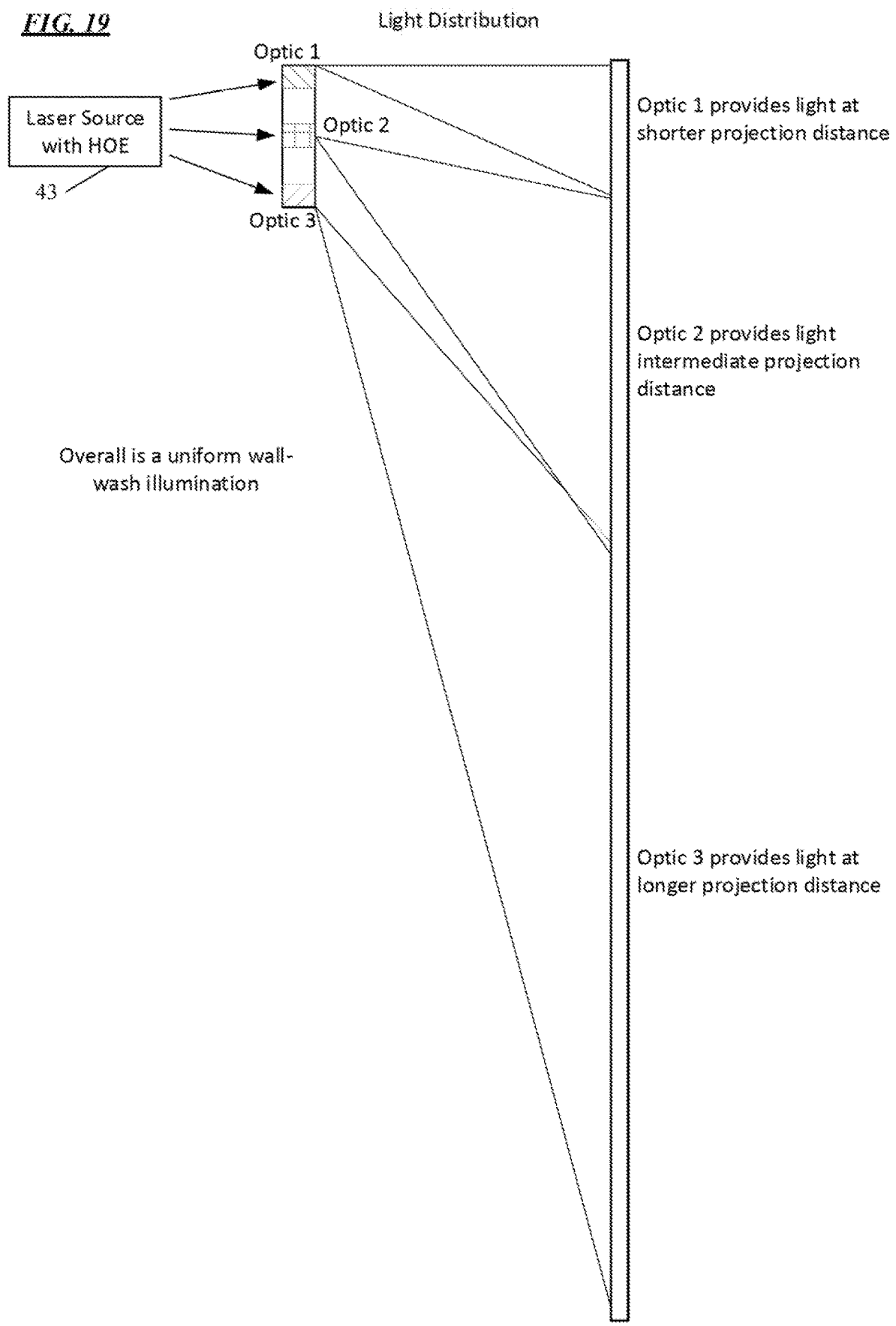
FIG. 19 is a side view of a luminaire of the type discussed herein configured for an illumination application with respect to a wall or other architectural panel.

As noted in the discussion of FIGS. 5 and 6, the computer generated hologram may be configured to provide an asymmetric light distribution tailored to a particular general illumination application. FIG. 19 shows another example luminaire using a somewhat different configuration to provide an asymmetric light output distribution, for example of a "wall wash" type uniform illumination on a wall or other architectural panel.

For simplicity, FIG. 19 shows a module 43. The module 43 includes a laser light source and a holographic optical element as in any of the earlier examples. The luminaire of FIG. 19 includes a system of three optics, although fewer or more optics may be provided. The holographic optical element combined with suitable optics enables this example of a laser based luminaire to more readily provide the asymmetric light distribution for general illumination of an architectural panel in a manner intended to appear substantially uniform to a person in the vicinity, e.g. for a wall wash application.

The distribution by the hologram and the optics are designed to put different amounts of light onto different areas of a surface, such as different areas of the wall. Although the surface of the architectural panel may have other contours, e.g. a curvature as on a pillar or a domed ceiling, the drawing shows a flat surface of a wall or the like for simplicity. The surface may be textured or configured with protruding features, for a desired visual effect. For a wall wash application, however, the flat surface typically is fairly smooth. Optic 1 provides angular light distribution over a short projection distance to an area of the surface near the top and thus nearer to the luminaire. Optic 2 provides angular light distribution over an intermediate distance to an area of the surface near the middle of the wall, and somewhat further from the luminaire. The area of the surface illuminated via optic 2 is larger than the area illuminated via optic 1, in the vertical dimension in the illustrated orientation. Optic 3 provides angular light distribution over a longer projection distance to an area of the surface extending near the bottom of the wall and furthest from the luminaire in the example. The area of the surface illuminated via optic 3 is larger than the area illuminated via optic 2, in the vertical dimension in the illustrated orientation.

The hologram in module 43, in this example, is designed to provide higher intensity light to the phosphor sub-region(s) coupled to optic 3, an intermediate intensity light to the phosphor sub-region(s) coupled to optic 2 and a lower intensity light to the phosphor sub-region(s) coupled to optic 1 such that the overall illumination of the wall surface appears substantially uniform (e.g. the intensity on the wall is uniform within some acceptable tolerance range, or is free of gradient irregularities that might otherwise appear as striations). The simple example assumes only three optics, but there may be additional optics or just two different optics.

The drawings and the descriptions of laser based luminaires above have included a variety of example structures for the luminaire components and arrangements of such components. It should be understood that those structures and arrangements are non-limiting and that other structures for some or all of the components and/or other component arrangements may be utilized. For example, the drawings show photoluminescent materials and substrates arranged for transmission of light therethrough. The laser-based general illumination luminaire, however, may instead utilize reflective photoluminescent materials or reflective substrates for the photoluminescent materials.

Luminaires of the types disclosed herein may be adapted for transmission of data via modulation of the generation of the beam or beams by the laser light source. Although some of the laser light is absorbed by the photoluminescent material to cause the material to generate light of different wavelengths, some of the laser light passes through the photoluminescent material. The combined light output from the luminaire, for example, may appear white, in many of the luminaire examples described herein. Traditional yellow emitting phosphors cause a delay. The portion of the laser light distributed from the holographic element that passes through the photoluminescent material without wavelength conversion, however, will still exhibit the modulation applied at the laser light source. If the yellow phosphor transition cycle time is too long to carry the data, the receiver may include a blue pass filter and respond to modulation on the blue light from the holographic optical element. More modern QD phosphors cycle more rapidly, which may mitigate this issue.

The luminaire design provides high optical efficiency of the system as well as high optical efficiency for diffraction. A laser-based luminaire may offer high optical efficiency for beam steering of highly polarized light carrying the data. Amplitude-shift keying (ASK) modulation stays valid after diffraction and is suitable for data communication in the example laser-based luminaires, although other modulation techniques may be used.

A high-speed laser light source, for example, may support giga bit per second (Gbps) or higher data communication rates. The modulation, however, only requires modulated driving of a small number of laser light emitters, as compared to modulating outputs of a larger number of LEDs in more traditional solid state luminaires.

Figure 20:
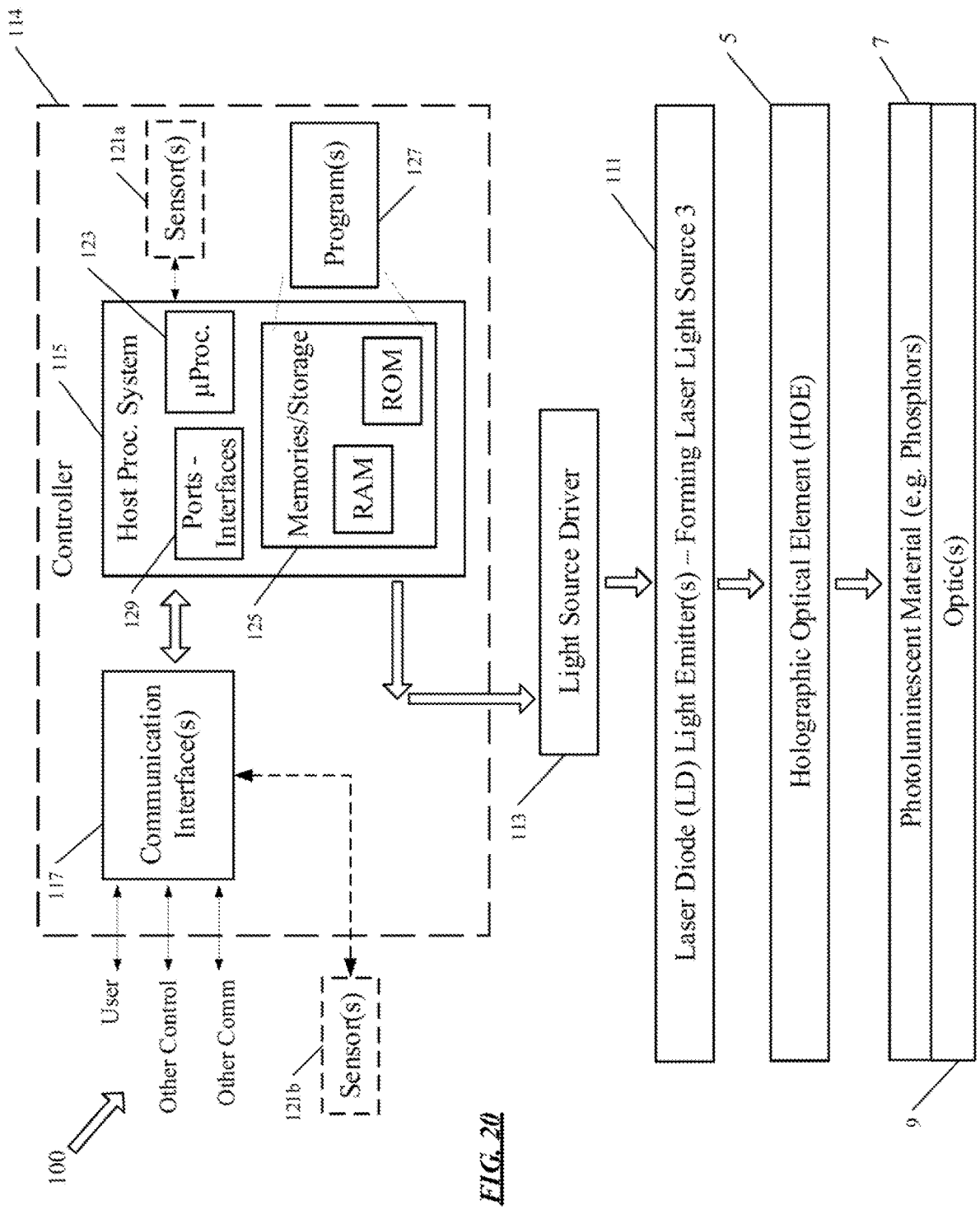
FIG. 20 is a high-level functional block diagram of a smart implementation of a lighting device, which utilizes a laser light source, a holographic optical element, a photoluminscennt material and an optical system as in one of the earlier luminaire examples.

FIG. 20 is a high-level functional block diagram of a lighting device 100, which utilizes one or more laser diodes 111 forming the laser light source 3 (FIG. 1), a holographic optical element 5, a photoluminescent material 7 (e.g. phosphors) and an optical system 9 as in any one of the earlier luminaire examples. Although other control architectures may be utilized, the example device 100 utilizes a processor based 'intelligent' arrangement with associated communication capabilities.

The example device 100 also includes a light source driver 113 coupled to selectively drive individual laser diode type light emitters 111 of the laser light source 3. In its simplest form, the driver may be controlled by a switch to apply power to the driver 113 or possibly a switch with a dimmer to provide simple adjustable control of the power supplied to the driver 113. In the illustrated 'smart' lighting device 100, however, a controller 114 is coupled to control the individual laser diodes 111, via the driver 113. The controller 114 is configured to control the laser diode type emitters 111 so as to operate the luminaire components as discussed earlier. For example, the controller may adjust drive current supplied to the laser diodes 111 to provide dimming or to modulate the light output from the luminaire, e.g. to carry data.

The driver 113 includes circuitry coupled to control light outputs generated by the laser diode type light emitters 111, for example, controllable power supply circuitry configured to variably supply appropriate drive current to one or more laser diodes 111 of a particular type. Although the driver 113 may be implemented as an element of the controller 114, in the example, the driver 113 is located separately from the controller 114. The driver 113 may be a separate device on one or more integrated circuits, or the driver 113 may be integrated on the sane semiconductor chip as some or all of the components of the controller 114.

Equipment implementing functions like those of lighting device 100 may take various forms. The light source formed by the laser diodes 111, the holographic optical element 5, the photoluminescent material 7 and any optical system 9 will be elements of a light fixture or other type of luminaire. In some examples, the light source driver 113 and/or the controller 114 also may be elements of a single hardware platform, e.g. a single laser and hologram based luminaire. In other examples, some components attributed to the lighting device 100 may be separated from the laser diodes 111, the holographic optical element 5, the photoluminescent material 7 and any optical system 9 in the luminaire. Stated another way, a light fixture or other suitable type of luminaire may have all of the above hardware components of the device 100 on a single hardware device or in different somewhat separate units. In a particular hardware-separated example, one set of the hardware components may be separated from the luminaire, such that the controller 114 and the driver 113 may control laser diode emitters 111 from a remote location. In an alternative example, with each luminaire including a driver together with the laser diode(s) 111, one controller 114 may control a number of such luminaires.

As shown by way of example in FIG. 20, the controller 114 of the lighting device 100 includes a host processing system 115 and one or more communication interface(s) 117. The host processing system 115 provides the high level logic or "brain" of the device 100. In the example, the host processing system 115 includes data storage/memories 125, such as a random access memory and/or a read-only memory, as well as programs 127 stored in one or more of the data storage/memories 125. The host processing system 115 also includes a central processing unit (CPU), shown by way of example as a microprocessor (μP) 123, although other processor hardware may serve as the CPU. An alternate implementation, for example, might utilize a microcontrol unit (MCU) which incorporates the CPU processor circuitry, the memories, interfaces for input/output ports, etc. on a single system on a chip (SoC).

The host processing system 115 is coupled to the communication interface(s) 117 for communication with the microprocessor 123 via an appropriate one of the ports/interfaces 129. In the example, the communication interface(s) 117 offer a user interface function or communication with hardware elements providing a user interface for the general illumination device 100. The communication interface(s) 117 may communicate with other lighting devices (similar to or different from laser based device 100) at a particular premises. The communication interface(s) 117 may communicate with other control elements, for example, a host computer of a building and control automation system (BCAS). The communication interface(s) 117 also may support device communication with a variety of other systems of other parties, e.g. the device manufacturer for maintenance or an on-line server, such as server for downloading of software and/or configuration data. If the device 100 will support light based data communication by modulating the laser light output and thus the luminaire light output, at least the downstream data for such communication may reach the lighting device 100 via a network coupled to the communication interface(s) 117.

The device 100 may also include one or more sensor(s) 121a or 121b. The sensors may be included in the controller 114 as shown at 121a and communicate to the microprocessor 123 via an appropriate one of the ports/interfaces 129. Alternatively, one or more sensors 121b may be coupled via a communication interface to provide data for processing by the host processing system 114. A variety of sensors may be provided, such as an image sensor, an occupancy sensor, an ambient light sensor, a temperature sensor, etc.

The illustration, by way of example, shows a single processor in the form of the microprocessor 123. It should be understood that the controller 114 may include one or more additional processors, such as multiple processor cores, parallel processors, or specialized processors (e.g. a math co-processor or an image processor).

Although specially configured circuitry may be used in place of microprocessor 123 and/or the entire host processor system 115, the drawing depicts a processor-based example of the controller 114 in which functions relating to the controlled operation of the device 100 may be implemented by the programming 127 and/or configuration data stored in a memory device 125 for execution by the microprocessor 123 (or other type of processor). The programming 127 and/or data configure the processor 123 to control system operations so as to implement functions of the device 100 described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A luminaire, for a general illumination application, the luminaire comprising:
  a laser light source;
  a holographic optical element, coupled to receive a beam of light from the laser light source, and having a hologram configured to distribute light from the beam as a pattern of light;
  a photoluminescent material configured to convert one or more wavelengths of incident light to wavelengths of light to provide an intended color characteristic of light for the general illumination application of the luminaire, the photoluminescent material being located to receive the pattern of light from the holographic optical element; and
  an optical system coupled to the photoluminescent material to distribute light from the photoluminescent material over an optical output distribution for the general illumination application of the luminaire;

wherein:
the hologram is configured to: split the beam of light from the laser light source into a plurality of beams forming the pattern of light, and to direct the plurality of beams to a plurality of regions of the photoluminescent material, and the optical system comprises a plurality of optics each coupled to a respective one of the regions of the photoluminescent material on at least one substrate.

2. The luminaire of claim 1, wherein the holographic element is a transmissive holographic element.

3. The luminaire of claim 1, wherein the holographic element is a reflective holographic element.

4. The luminaire of claim 1, wherein the at least one substrate comprises a light transmissive substrate supporting the regions of the photoluminescent material.

5. The luminaire of claim 1, wherein:
the at least one substrate comprises a light transmissive substrate, supporting the photoluminescent material, at a distance from the holographic optical element to receive the pattern of light as a projection on the photoluminescent material, and
the light transmissive substrate is substantially flat.

6. The luminaire of claim 1, wherein:
the at least one substrate comprises a light transmissive substrate, supporting the photoluminescent material, to receive the pattern of light as a projection on the photoluminescent material, and
the light transmissive substrate is curved relative to the projection.

7. The luminaire of claim 6, wherein a curvature of the light transmissive substrate is such that the photoluminescent material on the light transmissive substrate varies in distance from the holographic optical element.

8. The luminaire of claim 1, further comprising:
an optical filter located between the holographic optical element and the photoluminescent material,
wherein the optical filter is configured to pass light in a first wavelength bandwidth of the laser light source through the optical filter to the photoluminescent material.

9. The luminaire of claim 8, wherein the optical filter is further configured to reflect converted light of a second wavelength band from the photoluminescent material toward an output of the luminaire, the second wavelength band being different from the first wavelength band.

10. A luminaire, for a general illumination application, the luminaire comprising:
a laser light source;
a holographic optical element, coupled to receive a beam of light from the laser light source, and having a hologram configured to distribute light from the beam as a pattern of light;
a photoluminescent material configured to convert one or more wavelengths of incident light to wavelengths of light to provide an intended color characteristic of light for the general illumination application of the luminaire, the photoluminescent material being located to receive the pattern of light from the holographic optical element; and
an optical system coupled to the photoluminescent material to distribute light from the photoluminescent material over an optical output distribution for the general illumination application of the luminaire, the optical system including:

a light transmissive substrate, supporting the photoluminescent material, to receive the pattern of light as a projection on the photoluminescent material,
wherein the light transmissive substrate is curved relative to the projection.

11. A luminaire, for a general illumination application, the luminaire comprising:
a laser light source;
a holographic optical element, coupled to receive a beam of light from the laser light source, and having a hologram configured to distribute light from the beam as a pattern of light;
a photoluminescent material configured to convert one or more wavelengths of incident light to wavelengths of light to provide an intended color characteristic of light for the general illumination application of the luminaire, the photoluminescent material being located to receive the pattern of light from the holographic optical element;
an optical filter located between the holographic optical element and the photoluminescent material, wherein the optical filter is configured to pass light in a first wavelength bandwidth of the laser light source through the optical filter to the photoluminescent material; and
an optical system coupled to the photoluminescent material to distribute light from the photoluminescent material over an optical output distribution for the general illumination application of the luminaire.

12. A general illumination lighting device, comprising:
a laser light source;
a photoluminescent material;
a holographic optical element optically coupled to the laser light source and to the photoluminescent material, the holographic element having a hologram configured to distribute light received from the laser light source as a pattern of light to the photoluminescent material;
an optical system coupled to the photoluminescent material to distribute light from the photoluminescent material over an optical output distribution of the general illumination lighting device; and
a controllable drive circuit to supply power to the laser light source;
wherein:
the hologram is configured to: split the beam of light from the laser light source into a plurality of beams forming the pattern of light, and to direct the plurality of beams to a plurality of regions of the photoluminescent material, and
the optical system comprises a plurality of optics each coupled to a respective one of the regions of the photoluminescent material on at least one substrate.

13. The general illumination lighting device of claim 12, further comprising a processor coupled to control operation of the laser light source via the controllable drive circuit.

14. The general illumination lighting device of claim 12, wherein the laser light source includes a laser diode.

15. The general illumination lighting device of claim 12, wherein the laser light source includes a plurality of laser diodes.

16. The general illumination lighting device of claim 12, wherein the holographic element is a transmissive holographic element.

17. The general illumination lighting device of claim 12, wherein the holographic element is a reflective holographic element.

18. A general illumination lighting device, comprising:
a laser light source;
a photoluminescent material;
a holographic optical element optically coupled to the laser light source and to the photoluminescent material, the holographic element having a hologram configured to distribute light received from the laser light source as a pattern of light to the photoluminescent material; and
an optical system coupled to the photoluminescent material to distribute light from the photoluminescent material over an optical output distribution of the general illumination lighting device, the optical system including:
  a light transmissive substrate, supporting the photoluminescent material, to receive the pattern of light as a projection on the photoluminescent material,
  wherein the light transmissive substrate is curved relative to the projection; and
a controllable drive circuit to supply power to the laser light source.

* * * * *